US012694088B2

(12) United States Patent
Constantine et al.

(10) Patent No.: US 12,694,088 B2
(45) Date of Patent: Jul. 28, 2026

(54) COMPUTER CHALLENGE SYSTEMS BASED ON IMAGE ORIENTATION MATCHING

(71) Applicant: ARKOSE LABS HOLDINGS, INC., San Mateo, CA (US)

(72) Inventors: Whitney Constantine, Brisbane (AU); Murry Lancashire, Brisbane (AU); James Clark, Brisbane (AU)

(73) Assignee: Arkose Labs Holdings, Inc., San Mateo, CA (US)

( * ) Notice: Subject to any disclaimer, the term of this patent is extended or adjusted under 35 U.S.C. 154(b) by 188 days.

(21) Appl. No.: 18/159,734

(22) Filed: Jan. 26, 2023

(65) Prior Publication Data

US 2023/0237142 A1 Jul. 27, 2023

Related U.S. Application Data

(60) Provisional application No. 63/303,861, filed on Jan. 27, 2022.

(51) Int. Cl.
G06F 21/36 (2013.01)

(52) U.S. Cl.
CPC ...... G06F 21/36 (2013.01); *G06F 2221/2103* (2013.01); *G06F 2221/2133* (2013.01)

(58) Field of Classification Search
CPC ............. G06F 21/36; G06F 2221/2103; G06F 2221/2133
See application file for complete search history.

(56) References Cited

U.S. PATENT DOCUMENTS

| | | | | |
|---|---|---|---|---|
| 8,406,456 B2 * | 3/2013 | More | .................. | G06V 10/462 |
| | | | | 713/176 |
| 2004/0053654 A1 * | 3/2004 | Kokumai | ................ | G06F 21/36 |
| | | | | 463/1 |
| 2008/0216163 A1 * | 9/2008 | Pratte | ..................... | G06F 21/36 |
| | | | | 726/7 |

(Continued)

FOREIGN PATENT DOCUMENTS

| | | | | |
|---|---|---|---|---|
| KR | 102014408 B1 * | 9/2017 | ............. | G06F 21/36 |

OTHER PUBLICATIONS

IP.com, Multi-factor Authentication using Real-World Object, Sep. 9, 2014, IP.com Prior Art Database Technical Disclosure, Composition and Analysis, pp. 1-6. (Year: 2014).*

*Primary Examiner* — Shin-Hon (Eric) Chen
*Assistant Examiner* — Abdullah Almamun
(74) *Attorney, Agent, or Firm* — Womble Bond Dickinson (US) LLP

(57) ABSTRACT

A method of securing a computer resource against unauthorized access includes sending, by a processing device, a challenge data structure to a user computer system, obtaining a user response representing at least one user-selected image from the plurality of images, and providing access to the computer resource for the user computer system based on whether the at least one user-selected image is consistent with the one or more correct images. The challenge data structure defines a challenge to be presented to a user of the user computer system. The challenge involves selecting one or more correct images that conform to one or more aspects of a challenge key from a plurality of images based on a relative orientation with respect to one another of elements within the plurality of images.

20 Claims, 15 Drawing Sheets

(56) References Cited

U.S. PATENT DOCUMENTS

| | | | | |
|---|---|---|---|---|
| 2010/0325706 | A1* | 12/2010 | Hachey | G06F 21/36 |
| | | | | 713/170 |
| 2014/0109208 | A1* | 4/2014 | Song | G06F 21/36 |
| | | | | 726/7 |
| 2016/0180546 | A1* | 6/2016 | Kim | G06T 7/248 |
| | | | | 382/103 |
| 2016/0306994 | A1* | 10/2016 | Olsen-Kreusch | H04L 9/3234 |
| 2018/0144654 | A1* | 5/2018 | Olsen, Jr. | G06V 10/763 |
| 2018/0189471 | A1* | 7/2018 | Paluri | G06F 21/36 |
| 2019/0303555 | A1* | 10/2019 | Agarwal | G06T 3/40 |
| 2019/0347398 | A1* | 11/2019 | Cramer | G06T 17/20 |
| 2020/0104475 | A1* | 4/2020 | Guionneau | H04L 9/0643 |
| 2020/0134159 | A1* | 4/2020 | Ford | G06F 21/31 |
| 2020/0410082 | A1* | 12/2020 | Sharieh | G06F 16/54 |
| 2021/0150273 | A1* | 5/2021 | Mustafi | G06F 18/2148 |
| 2021/0233203 | A1* | 7/2021 | Ross | G06F 18/22 |
| 2021/0397838 | A1* | 12/2021 | Holzschneider | G06F 16/51 |
| 2022/0124245 | A1* | 4/2022 | Kim | G06F 8/65 |
| 2022/0179938 | A1* | 6/2022 | Zotto | G06F 21/44 |
| 2022/0343522 | A1* | 10/2022 | Bi | G06T 17/20 |
| 2023/0396604 | A1* | 12/2023 | Cho | H04L 63/0823 |

* cited by examiner

1200

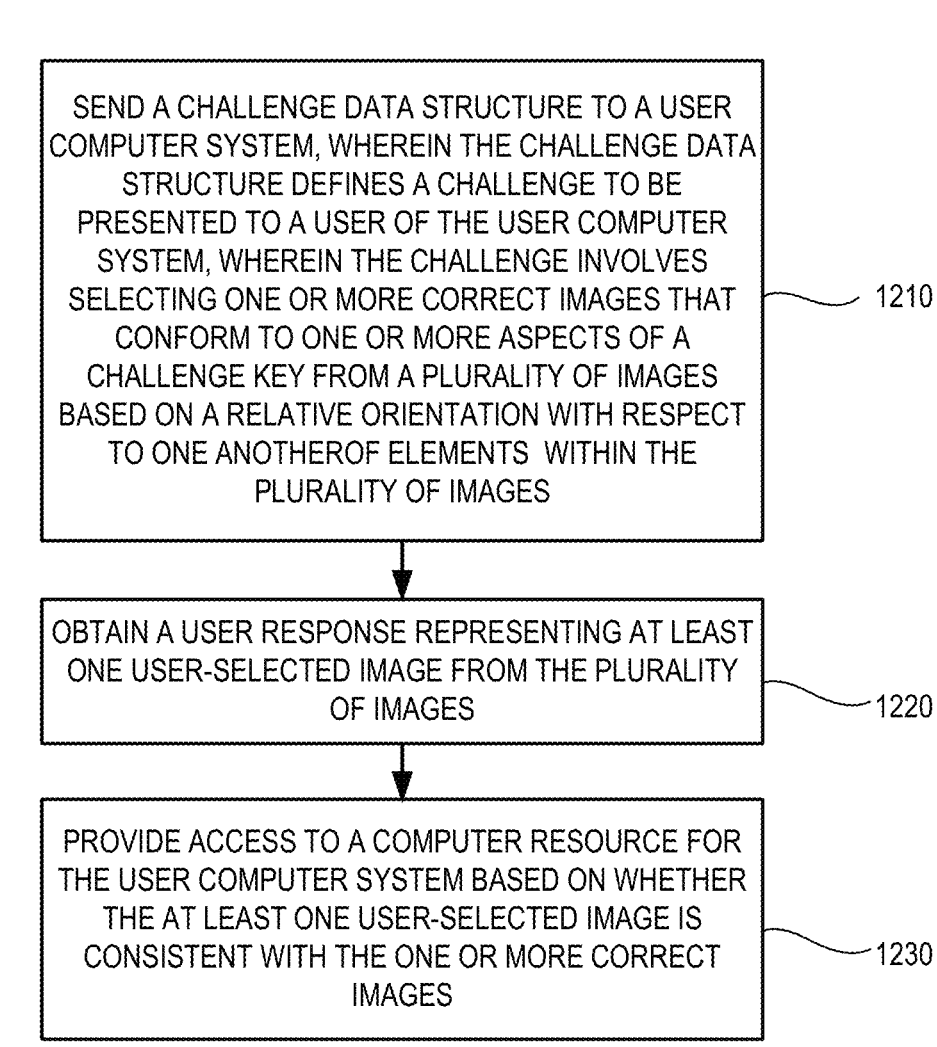

SEND A CHALLENGE DATA STRUCTURE TO A USER COMPUTER SYSTEM, WHEREIN THE CHALLENGE DATA STRUCTURE DEFINES A CHALLENGE TO BE PRESENTED TO A USER OF THE USER COMPUTER SYSTEM, WHEREIN THE CHALLENGE INVOLVES SELECTING ONE OR MORE CORRECT IMAGES THAT CONFORM TO ONE OR MORE ASPECTS OF A CHALLENGE KEY FROM A PLURALITY OF IMAGES BASED ON A RELATIVE ORIENTATION WITH RESPECT TO ONE ANOTHEROF ELEMENTS  WITHIN THE PLURALITY OF IMAGES

1210

OBTAIN A USER RESPONSE REPRESENTING AT LEAST ONE USER-SELECTED IMAGE FROM THE PLURALITY OF IMAGES

1220

PROVIDE ACCESS TO A COMPUTER RESOURCE FOR THE USER COMPUTER SYSTEM BASED ON WHETHER THE AT LEAST ONE USER-SELECTED IMAGE IS CONSISTENT WITH THE ONE OR MORE CORRECT IMAGES

COMPUTER CHALLENGE SYSTEMS BASED ON IMAGE ORIENTATION MATCHING

CROSS-REFERENCE TO RELATED APPLICATION

This application claims the benefit of U.S. Provisional Application No. 63/303,861, filed on Jan. 27, 2022, the entire content of which is hereby incorporated by reference herein.

FIELD

The present disclosure generally relates to controlling access to computer resources to limit automated and unintended accessing of the computer resources. The disclosure relates more particularly to apparatus and techniques for presenting challenges to users that utilize images.

BACKGROUND

Computer resources are often created for access by humans and the creators may seek to reduce or block access to those computer resources when the access is by unintended users such as an automated process that is attempting access or by unintended human users who may be attempting to access the computer resources in ways unintended or undesired by their creators. For example, a web server serving web pages related to a topic may be set up for human users to browse a few pages but not set up for an automated process to attempt to browse and collect all available pages or for persons employed to scrape all of the data. As another example, a ticket seller may wish to sell tickets to an event online, while precluding unauthorized resellers from using an automated process to scrape data off the ticket seller's website and buy up large quantities of tickets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 12 is a flow diagram of a method for scheduling a software container, in accordance with some embodiments of the present disclosure.

DETAILED DESCRIPTION

Figure 1:
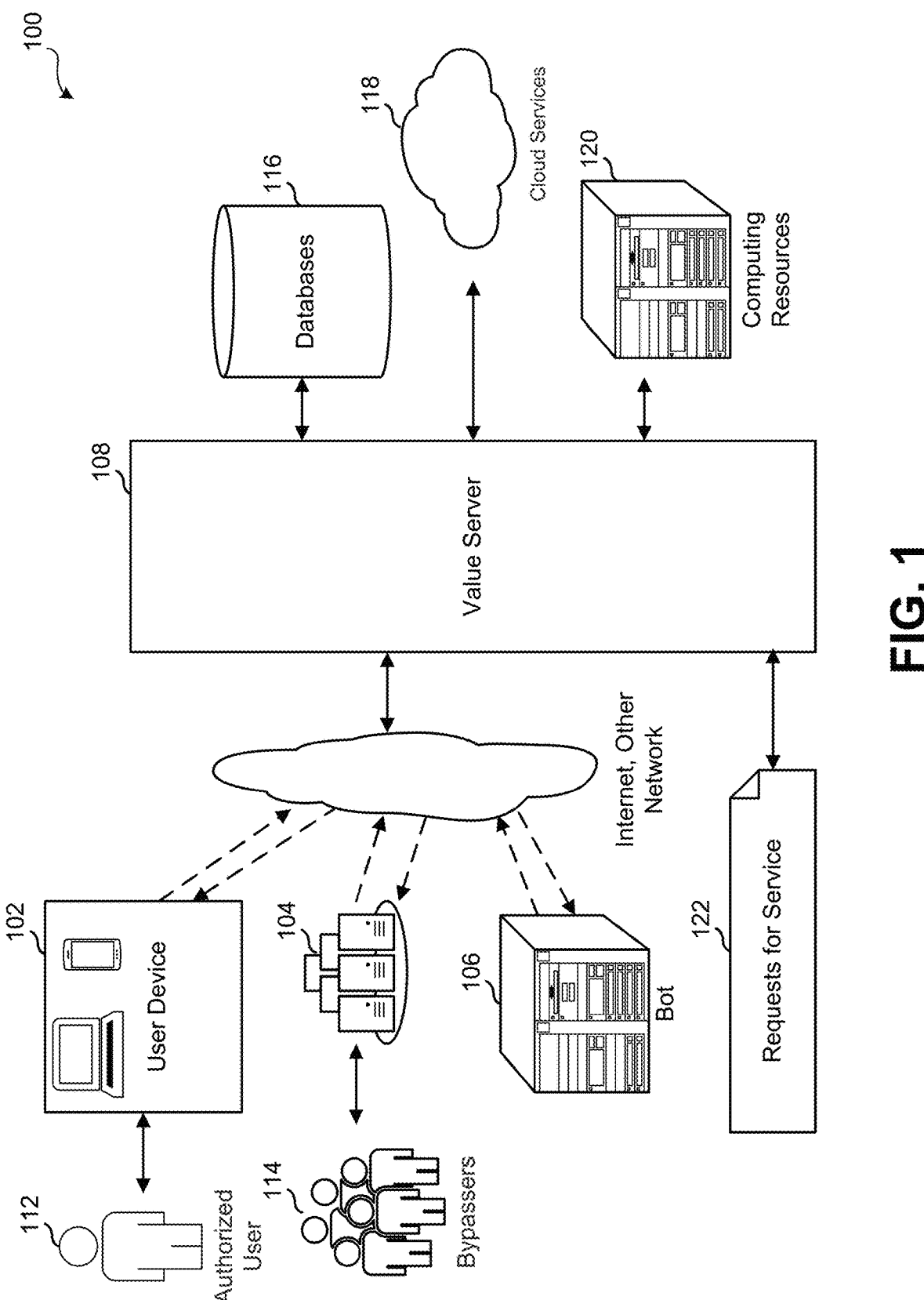
FIG. 1 is a block diagram of a network environment wherein an authentication challenge system may be deployed, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Unauthorized access and/or unwanted access to computer resources may be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like. In some cases, systems may perform user authentication, such as presenting authentication challenges in order to distinguish authorized users of a computing asset from unauthorized users. Unauthorized users may include unauthorized human users, users attempting to bypass controls ("bypassers"), and/or unauthorized automated agents.

A provider of computer resources may wish to determine whether a given user accessing those computer resources is a legitimate human user, an automated process, or a bypasser, given that access to the resources would be computer-mediated in each case. For example, companies and other organizations may create materials and make them available online, sometimes via intermediaries that charge per view. These organizations may spend huge sums, or make significant efforts, in creating and disseminating these materials, but wish to ensure that real, human consumers in their target audience view particular materials, as automated agents can generate false impressions that someone in the target audience has viewed the materials when in fact no real human in the target audience has done so. In some cases, there may be humans accessing that content, but not be in the target audience, such as someone deployed to access the content without viewing the materials. Companies and other organizations lose the effect of the money they pay by spending for these false impressions by unintended users, whether human or not.

Techniques described and suggested herein solve these and other problems by presenting computer authentication challenges and processing responses to computer authentication challenges. An authentication challenge may be issued and managed by an authentication program or system used to ensure that information entered into a computer, such as via a web site, is entered by a human user of a computing device rather than by an automated program commonly known as a bot or an agent. Agents are commonly used by computer hackers in order to gain illicit entry to web sites, or to cause malicious damage, for example by creating a large amount of data in order to cause a computer system to crash, by creating a large number of fictitious membership accounts in order to send spam, by skewing results of a vote or poll, by entering a contest many times, or by guessing a password or decryption key through a brute force method, etc. Thus, it can be desirable to detect such activities to block or limit them.

One example of such a user authentication program may present a string of arbitrary characters to a user and prompt the user to enter the presented characters. If the user enters the characters correctly, the user is allowed to proceed. Automated agents that have adapted to include character recognition may be able to circumvent such authentication programs. Authentication programs such as CAPTCHA ("Completely Automated Public Turing test to tell Computers and Humans Apart") programs have been developed to disguise text characters, for example by adding background noise, or randomly positioning the characters on the screen, rather than in pre-defined rows. Although such programs are successful at preventing some agents from accessing a computer, it also can be difficult for authorized human users to read such disguised characters. As such, character-based CAPTCHA authentication programs often can be frustrating and tedious to use.

Authentication programs may be able to be bypassed by somewhat sophisticated agents that can determine the requested answer despite the disguise. As such, character-based CAPTCHA authentication programs often fail to prevent automated abuse of the protected computer system.

Another example of a user authentication program may present a grid of photographs to a user and prompt the user to select one or more photographs that meet a stated criterion (e.g., "From the displayed pictures, select those that contain construction vehicles"). Although such programs can be successful at preventing some agents from accessing a computer, it also can be difficult for human users to decide whether the instruction applies or does not apply to photographs with ambiguous contents, such as whether a consumer-grade sports utility vehicle should be regarded as a construction vehicle. As a result, photo-based CAPTCHA authentication programs often can be frustrating and tedious to use for authorized users.

Such authentication programs may be able to be bypassed by somewhat sophisticated agents that can automatically recognize the contents of photographs and so such photo-based CAPTCHA authentication programs that rely solely on image recognition can fail to prevent automated abuse of the protected computer system.

An authentication system that can be bypassed by a merely somewhat sophisticated agent can motivate computer hackers to invest a small amount of labor to create such an agent, provided that the reward for bypassing the authentication system is greater than the investment that must be made to create the agent. On the other hand, an authentication system that can only be bypassed by a highly sophisticated agent may discourage computer hackers from investing the large amount of labor needed to create such an agent, as the reward for bypassing the authentication system may be smaller than the investment that must be made to create the agent.

Authentication system design therefore often takes into account these considerations, to provide a method and system for user authentication that is both easy for authorized users to pass without frustration and tedium and very difficult for unauthorized users, or at least create enough of a cost for unauthorized users to discourage investment of labor into creating a work-around.

In an example hardware system according to some embodiments of the present disclosure, an authentication challenge system may be coupled with a value server that serves or manages some protected computer resource that can be accessed by user devices and is to be protected by the authentication challenge system against unauthorized user device access while permitting authorized user devices to access the value server, to some level of protection. The level of protection may not be absolute in that some authorized user devices may be blocked from access and some unauthorized user devices may obtain access.

FIG. 1 is a block diagram of a network environment 100 wherein an authentication challenge system may be deployed, according to an embodiment. In the example shown in FIG. 1, a user device 102, a set of bypasser devices 104, and a bot 106 may be attempting to obtain services from a value server 108. It is assumed in this example that a user 112 operating user device 102 is an authorized user to whom an operator of value server 108 is willing to provide services, whereas the operator is not willing to provide services to bypassers 114 using set of bypasser devices 104 or to bot 106. The particular services provided are not necessarily relevant to processes of trying to allow authorized access and trying to prevent unauthorized access, but examples are illustrated, including databases 116, cloud services 118, and computing resources 120. Those services may include serving webpages and interactions with users. Various devices may send requests 122 for services and receive in response the requested services, receive a challenge (possibly followed by the requested services if the challenge is met), or receive a rejection message. As explained herein, the challenge could be a process that is designed to filter out requesters based on an ability to meet a challenge, where meeting the challenge requires some real-world experience not easily emulated by a computer—thus potentially blocking bot 106 from accessing services—and that is potentially time-consuming for bypassers 114 to work on—thus potentially making the requests economically infeasible for a hired set of bypassers 114 or other bypassers 114 who may not be interested in the requested services as much as bypassing controls for others or for various reasons, all while limiting a burden on an authorized legitimate user (e.g., authorized user 112) of the services.

Figure 2:
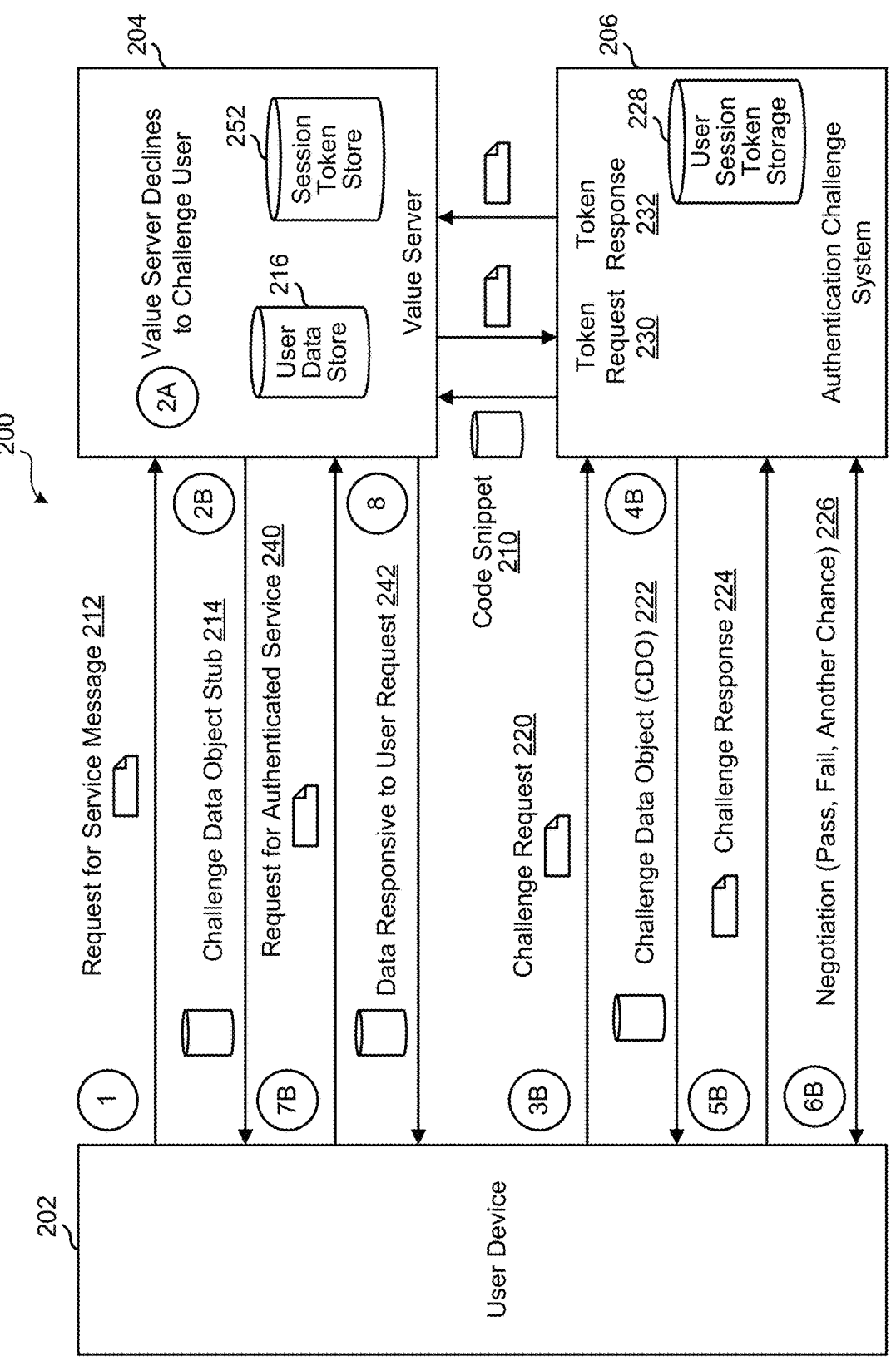
FIG. 2 is a block diagram of an authentication challenge system and exemplary components, according to an embodiment of the present disclosure.

FIG. 2 is a block diagram of an authentication challenge system 200 and example components, according to an embodiment. Messages and data objects that are passed among components are shown in greater detail than in FIG. 1, but user device 202 in FIG. 2 may correspond to user device 102 in FIG. 1, a bypasser device 104 of FIG. 1, or bot 106 of FIG. 1, while value server 204 may correspond to value server 108 of FIG. 1. That said, those like components may be different or differently configured.

Also illustrated in FIG. 2 are indicators of a typical order of operations of communications among user device 202, value server 204, and an authentication challenge system 206. It should be noted that other orders of operations may be taken, and some operations may be omitted or added. In a precursor operation, authentication challenge system 206 may supply value server 204 a code snippet 210 usable by value server 204 for handling challenges.

In an operational process illustrated, user device 202 may send a "request for service" message 212 to value server 204 (referenced as communication "1"). Value server 204 may then determine whether a challenge is to be provided and either declines to challenge the user device 202 making the request (communication 2A) or to challenge the user device 202 making the request. For example, where user device 202 is already logged in and authenticated to value server 204, value server 204 may have enough information to be able to skip a challenge process and may respond to the user request immediately without requiring further authentication.

In the case where value server 204 decides to challenge, value server 204 may send (communication 2B) a challenge data object (CDO) stub 214 to user device 202. CDO stub 214 may have been supplied as part of code snippet 210 from the authentication challenge system 206. In some embodiments, what is sent is an entire CDO as explained herein elsewhere. In some embodiments, as explained herein elsewhere, CDO stub 214 may include information about the user or the request and such information may be encrypted or signed such that user device 202 cannot easily alter the information without that alteration being detected. Such information may include details about the user that are known to value server 204, such as an IP address associated with the request, country of origin of the request, past history of the user, if known, etc. This data may be stored as user data in user data store 216.

CDO stub 214 may be code, a web page, or some combination that is designed to have user device 202 issue a challenge request 220 (communication 3B). For example, CDO stub 214 may be code that generates and transmits challenge request 220, or it may be a web page that is displayed by user device 202, perhaps with a message like "Click on this line to get validated before you can access the requested resource" with the link directed to authentication challenge system 206. In response to receiving challenge request 220, authentication challenge system 206 may respond (communication 4B) with a challenge data object (CDO) 222, example structures of which are detailed herein elsewhere.

CDO 222 may include code, a web page, or some combination that can be processed by user device 202 to present a challenge to a user of user device 202. Authentication challenge system 206 may then await a response from user device 202, typically while handling other activities asynchronously. User device 202 may send a challenge response 224 (communication 5B) to authentication challenge system 206. The challenge response 224 may be a result of input provided by the user of the user device 202. For example, the challenge response 224 may be generated in response to interaction of one or more input devices (e.g., a keyboard, mouse, touch screen, speaker, etc.) of the user device 202. As explained elsewhere herein, authentication challenge system 206 can process challenge response 224 in light of CDO 222 and evaluate whether the user satisfied the challenge represented in CDO 222 and then engage in a negotiation 226 (explained in more detail below) with user device 202 (communication 6B).

If authentication challenge system 206 determines that the challenge was met, communication 6B (negotiation 226) can be in the form of a "pass" message, while if authentication challenge system 206 determines that the challenge was not met, communication 6B can be in the form of a "fail" message. Another alternative is a message indicating that the user has additional chances to try again, perhaps with a new challenge included with such alternative message (e.g., "Your answer did not seem right, given the challenge. Click here to try again.").

Challenge response 224 and/or challenge request 220 may include information from value server 204 that passed through user device 202, perhaps in a secured form. That information may allow authentication challenge system 206 to identify the user and a user session for which the challenge is to apply. Authentication challenge system 206 may then store a user session token in user session token storage 228 indicating the results of the challenge. Then, when value server 204 sends a token request 230 identifying the user and user session, authentication challenge system 206 can reply with a token response 232 indicating whether the user met the challenge, and possibly also that the user did not meet the challenge or that the user never requested a challenge or responded to one.

The CDO stub 214 may be such that the user device 202 may send a request for authenticated service to value server 204, such as a webpage portion that instructs "Once you are authenticated, click here to proceed to your desired content" or the like in the form of a request for authenticated service 240 (communication 7B), which can signal to value server 204 that the user is asserting that they have completed the challenge. Of course, value server 204 need not trust the assertion, but may then be aware that authentication challenge system 206 may indicate that the challenge was indeed correctly responded to. Request for authenticated service 240 may be sent by user device 202 without user interaction after user device 202 receives a success message related to negotiation 226.

At this point, value server 204 can send token request 230 to authentication challenge system 206 and receive token response 232 from authentication challenge system 206. In some embodiments, value server 204 may wait a predetermined time period and send token request 230 without waiting for a signal from user device 202. In such embodiments, user device 202 may not send a request for authenticated service after its initial request. In some embodiments, authentication challenge system 206 may delay sending token response 232 if authentication challenge system 206 is involved in processing a challenge with user device 202 such as when the user has not yet requested a challenge or has failed a challenge but is given another chance, so that authentication challenge system 206 can ultimately send a token response indicating a successful response to the challenge.

In any case, value server 204 may respond with data 242 responsive to the user request (communication 8). If authentication challenge system 206 can independently determine that user device 202 is operated by an authorized user, then authentication challenge system 206 may store a user session token in user session token storage 228 indicating that a challenge was met. In that case, the timing of receiving token request 230 may be less important, as authentication challenge system 206 would be ready to respond at any time.

A number of examples of challenges are described in detail herein, including possible user responses that could be conveyed in challenge response messages. While just one challenge process was described in detail, it should be understood that value server 204 may process many requests in parallel and interact with more than one authentication challenge system and authentication challenge system 206 may process requests from many user devices in parallel and interact with many value servers.

Challenge response message 224 may include, in addition to an indication of the user's response to the challenge, a challenge identifier that identifies CDO 222 that was sent to challenge the user, in which case authentication challenge system 206 can easily match up the response with the challenge to determine if the response is consistent with an answer key for the specific challenge given.

Once value server 204 receives token response 232 and token response 232 indicates that the user is authenticated and not an undesired user, value server 204 can determine its next operation. Value server 204 may also store token response 232 into a session token store 252 usable for handling subsequent requests from the user. At this point in the process, whether value server 204 determined that no challenge was to be provided (communication 2A) or determined a challenge was to be provided and has a token response indicating that the challenge was met, value server 204 can respond to the request of the user device 202.

In some embodiments of the process, the processing may be done in a time period similar to a time period normally required for processing service requests. In other words, it could appear to the user that the processing is quick, except for the time the user takes to mentally process and respond to the challenge presented. As explained herein below, CDOs may be created in advance for quick deployment.

In the example shown in FIG. 2, a value server is configured to handle some of the authentication processes. Another variation could be used where the value server does not handle any authentication and may not even be aware it is happening. This may be useful for securing legacy systems.

Figure 3:
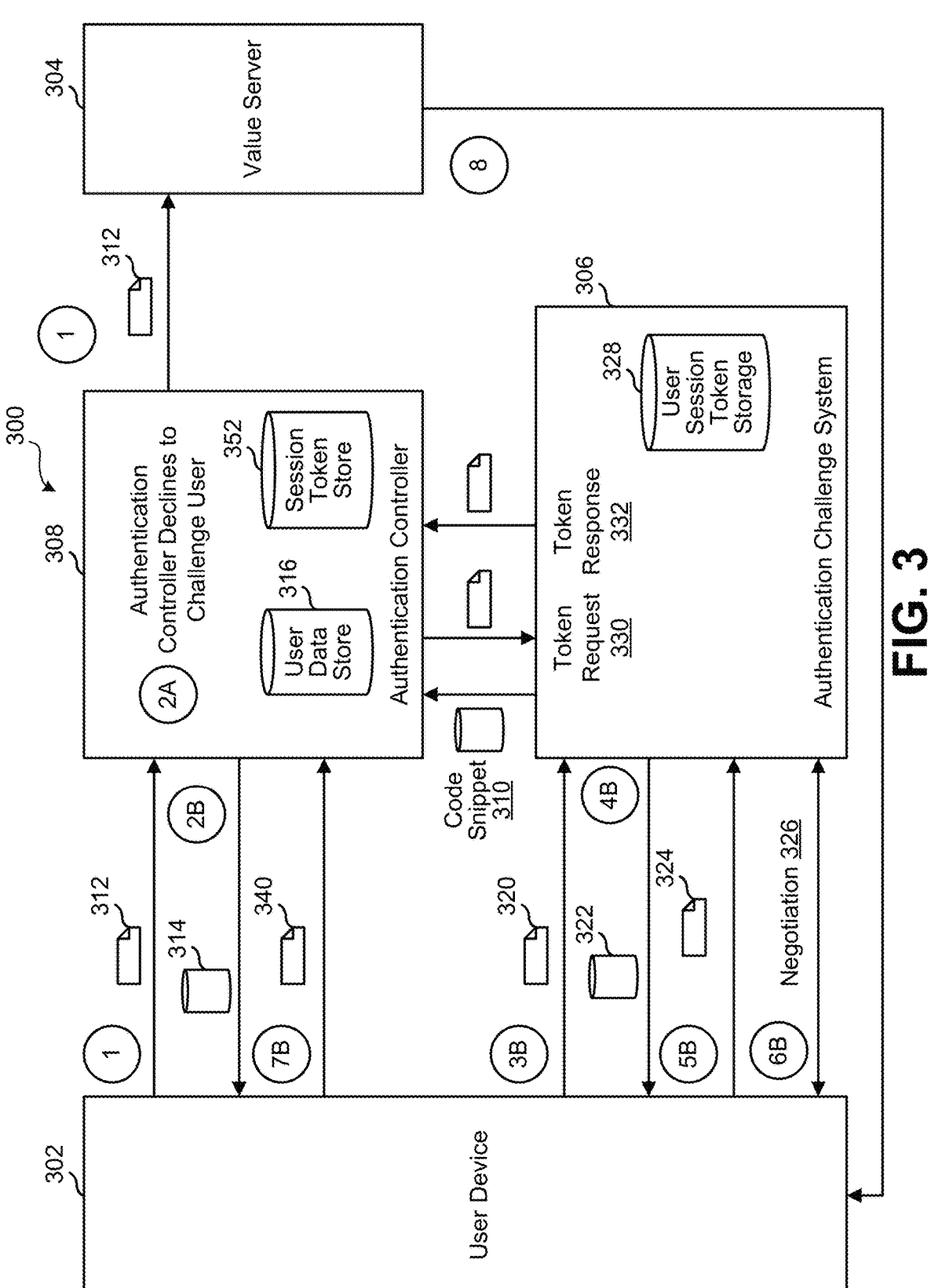
FIG. 3 is a block diagram of a system in which a value server is secured using an authentication controller for access control, in accordance with some embodiments of the present disclosure.

FIG. 3 is a block diagram of a system 300 in which a value server 304 is secured using an authentication controller for access control such that requests from a user device 302 can be limited, mostly, to requests from authorized users. As shown there, an authentication challenge system 306 and an authentication controller 308 together operate to control access of user device 302 to value server 304. As illustrated, a communication 1 comprises a request for services 312 from user device 302 to authentication controller 308 and may be a request similar to other requests described herein.

Also illustrated in FIG. 3 are indicators of a typical order of operations of communications among user device 302, value server 304, authentication challenge system 306, and authentication controller 308. It should be noted that other orders of operations may be taken, and some operations may be omitted or added. In a precursor operation, authentication challenge system 306 may supply authentication controller 308 a code snippet 310 usable by authentication controller 308 for handling challenges. In some embodiments, authentication challenge system 306 and authentication controller 308 are integrated.

In an operational process illustrated, user device 302 sends a "request for service" message 312 towards value server 304 (communication 1), which is either intercepted by authentication controller 308 or passed through to value server 304. As with value server 204 of FIG. 2, authentication controller 308 determines whether a challenge is to be provided and either declines to challenge the user device 302 making the request (communication 2A) or to challenge the user device 302 making the request, possibly relying on user data in a user data store 316.

In the case where authentication controller 308 decides to challenge, authentication controller 308 sends a challenge data object (CDO) stub 314 to user device 302 (communication 2B). CDO stub 314 may be code, a web page, or some combination that is designed to have user device 302 issue a challenge request 320 (communication 3B) to authentication challenge system 306, similar to CDO stub 214 shown in FIG. 2. In response to receiving challenge request 320, authentication challenge system 306 may respond (communication 4B) with a challenge data object (CDO) 322, similar to CDO 222 of FIG. 2. Authentication challenge system 306 may then await a response from user device 302, typically while handling other activities asynchronously. User device 302 may send a challenge response 324 (communication 5B) to authentication challenge system 306. The challenge response 324 may be a result of input provided by the user of the user device 302. For example, the challenge response 324 may be generated in response to interaction of one or more input devices (e.g., a keyboard, mouse, touch screen, speaker, etc.) of the user device 302. Authentication challenge system 306 can process challenge response 324 in light of CDO 322 and evaluate whether the user satisfied the challenge represented in CDO 322 and then engage in a negotiation 326 with user device 302 (communication 6B).

If authentication challenge system 306 determines that the challenge was met, communication 6B (negotiation 326) can be in the form of a "pass" message, while if authentication challenge system 306 determines that the challenge was not met, communication 6B can be in the form of a "fail" message. Another alternative is a message indicating that the user has additional chances to try again, perhaps with a new challenge included with such alternative message.

Challenge response 324 and/or challenge request 320 may include information from authentication controller 308 that passed through user device 302, perhaps in a secured form. That information may allow authentication challenge system 306 to identify the user and a user session for which the challenge is to apply. Authentication challenge system 306 may then store a user session token in user session token storage 328 indicating the results of the challenge. Then, when authentication controller 308 sends a token request 330 identifying the user and user session, authentication challenge system 306 can reply with a token response 332 indicating whether the user met the challenge, and possibly also that the user did not meet the challenge or that the user never requested a challenge or responded to one. Authentication challenge system 306 and/or authentication controller 308 may have logic to delay token request 330 and/or token response 332 to give the user time to complete a challenge but can send token request 330 after receiving a request for authenticated service 340 (communication 7B). For example, authentication challenge system 306 may wait ten seconds after receiving token request 330 before responding with token response 332 if the user has not yet requested a challenge or has failed a challenge but is given another chance. Authentication controller 308 may have logic to delay sending token request 330 to give the user some time to complete a challenge process with authentication challenge system 306.

If authentication challenge system 306 can independently determine that user device 302 is operated by an authorized user, then authentication challenge system 306 may store a user session token in user session token storage 328 indicating that a challenge was met. While just one challenge process was described in detail, it should be understood that authentication controller 308 may process many requests in parallel and interact with more than one authentication challenge system and more than one value server and authentication challenge system 306 may process requests from many user devices in parallel and interact with many authentication controllers.

Challenge response 324 may include, in addition to an indication of the user's response to the challenge, a challenge identifier that identifies CDO 322 that was sent to challenge the user, in which case authentication challenge system 306 can easily match up the response with the challenge to determine if the response is consistent with an answer key for the specific challenge given.

Once authentication controller 308 receives token response 332 and token response 332 indicates that the user is authenticated and not an undesired access, authentication controller 308 can determine its next operation. Authentication controller 308 may also store token response 332 into a session token store 352 usable for handling subsequent requests from the user. At this point in the process, whether authentication controller 308 determined that no challenge was to be provided (2A) or determined a challenge was to be provided and has a token response indicating that the challenge was met, authentication controller 308 can forward the user's request to value server 304, which may respond (communication 8) to user device 302 as if no authentication took place.

As with embodiments where a value server handles some of the tasks, all of the processing may be done in a time period similar to a time period normally required for processing service requests and CDOs may be created in advance for quick deployment. In some of these operations and examples, the communication and/or message or data sent corresponds to what is depicted in FIG. 3 and described herein.

An authentication challenge system may have multiple components, such as a decision server that decides whether a user device should be challenged, a response processor that evaluates user responses to challenges, a challenge server that outputs and manages challenges, a challenge creation system usable for creating challenges and classes of challenges, and an authentication access system that controls whether the user device obtains access to the value server. Some of these components may be integrated into a single system, such as where the challenge processor and decision server are integrated, the challenge processor and response processor are integrated, or all three are integrated.

Figure 4:
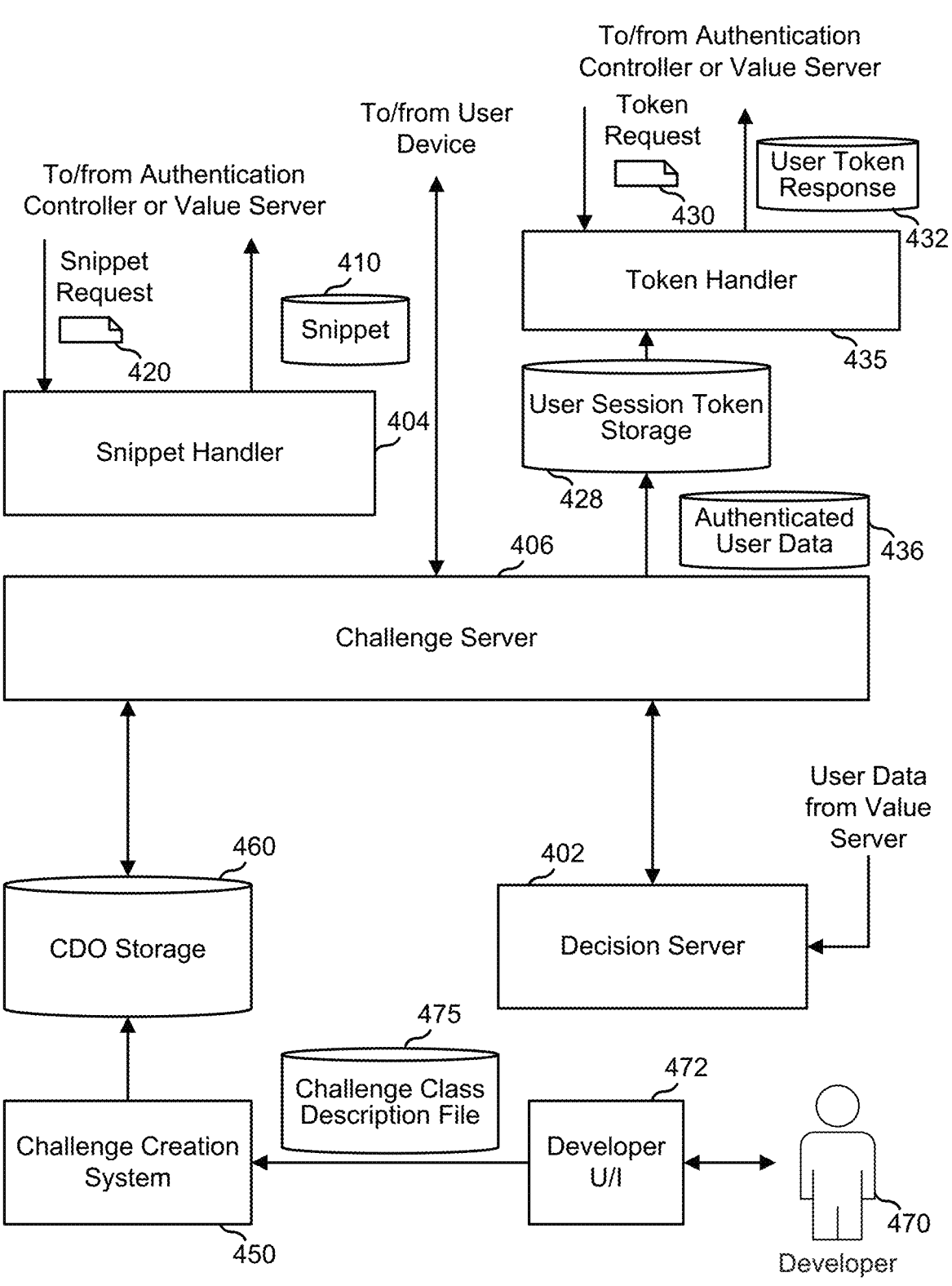
FIG. 4 is a block diagram of an authentication challenge system in an embodiment of the present disclosure.

FIG. 4 is a block diagram of an authentication challenge system in an embodiment. As illustrated there, an authentication challenge system may include a snippet handler 404 that receives a snippet request 420 from a value server or an authentication controller and responds with a code snippet 410, such as code snippets 210 and 310 (in FIGS. 2-3). A challenge server 406 may receive and respond to messages from a user device (as detailed in FIG. 5). A token handler 435 may receive token requests 430 from a value server or an authentication controller and respond with a token response 432, such as token requests 230, 330 and token responses 232, 332 in FIGS. 2-3, in response to data read from a user session token storage 428. The challenge server 406 may provide user session data 436 for the user session token storage 428.

As shown, the challenge server 406 may interact with a decision server 402 that decides whether to challenge a user, perhaps based in part on user data received from a value server or an authentication controller. The challenge server 406 may interact with a CDO storage 460 to retrieve CDOs to provide to user devices. The CDO storage 460 may be pre-populated with CDOs for quick response. Those CDOs may be created in advance by a challenge creation system 450. A developer 470 may develop classes of challenges using a developer user interface 472 to create challenge class description files 475 that the challenge creation system 450 can use to generate large numbers of distinct CDOs. By being able to create large numbers of distinct CDOs from one challenge class description file 475, the labor effort per CDO can be reduced, allowing for many more distinct challenges (which may be more work for bypassers to try and work around) without requiring much more work on the part of developers 470.

Figure 5:
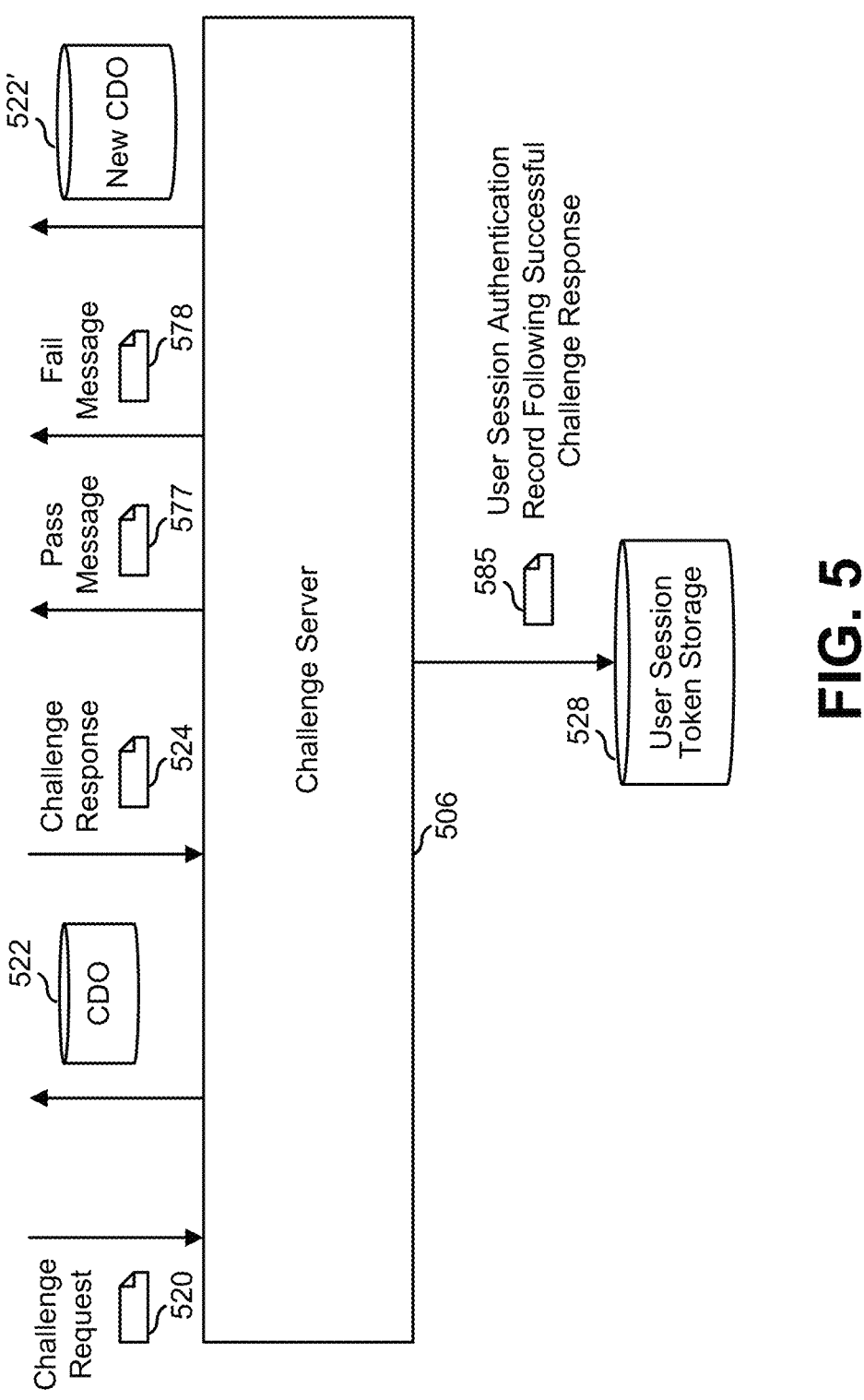
FIG. 5 is a block diagram showing user interactions with the challenge server, in an embodiment of the present disclosure.

FIG. 5 is a block diagram showing user interactions with the challenge server 506, in an embodiment. The challenge server 506 may be similar to that of the challenge server 406 of FIG. 4. As shown in FIG. 5, a user device (e.g., user device 202 or 302 of FIGS. 2 and 3) may send a challenge request 520 to the challenge server 506, which may respond with a CDO 522. The user device may send a challenge response 524, perhaps formatted so that the challenge server 506 can determine the corresponding CDO 522 or at least whether the challenge response 524 is a valid response. The challenge server 506 may then send the user device a "pass" message 577, a "fail" message 578, or a new CDO 522' giving the user a chance to respond to a new challenge. Where the user device provides a valid and correct challenge response 524, the challenge server 506 may then store a user session authentication record 585 into a user session token storage 528.

Figure 6:
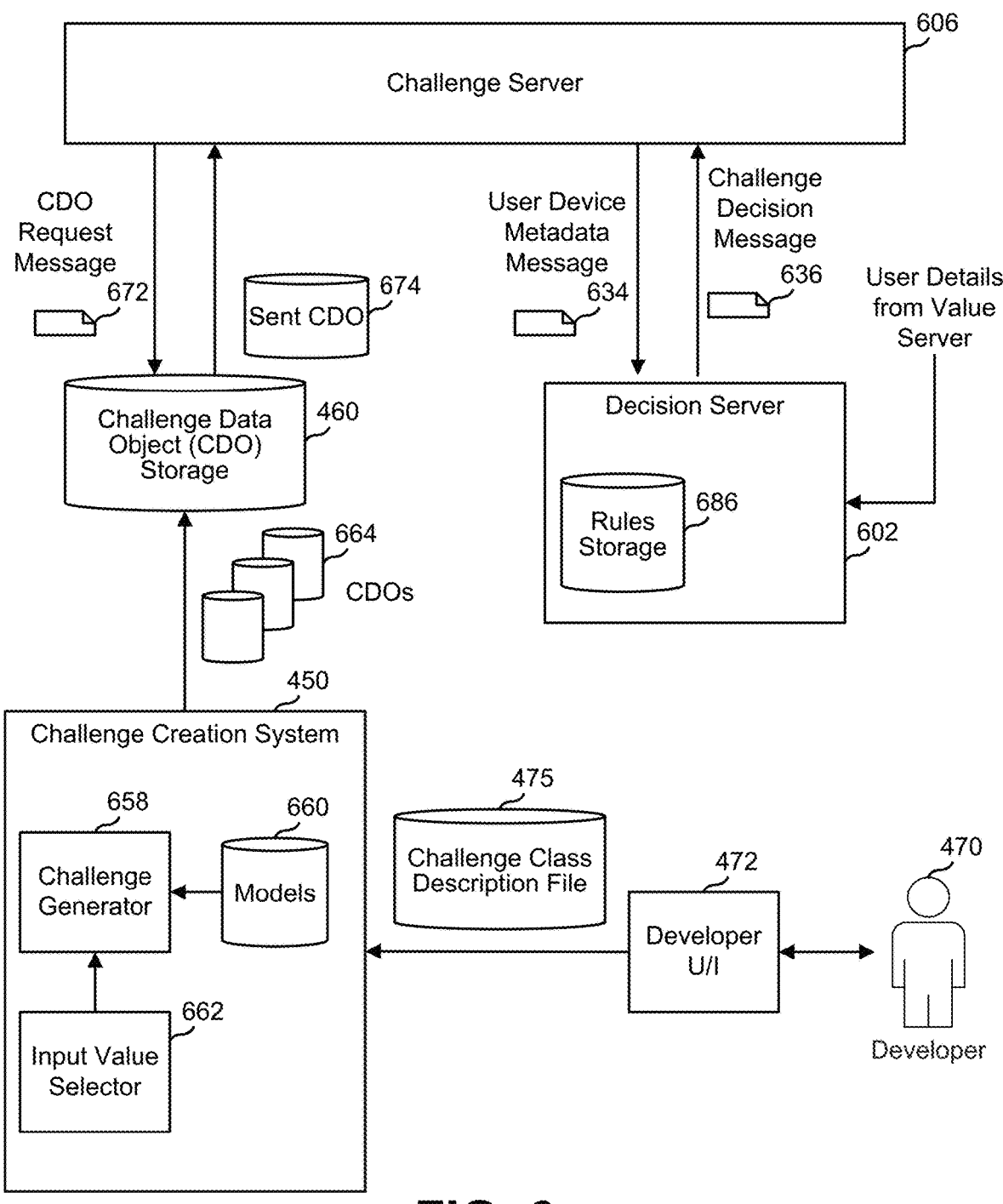
FIG. 6 illustrates internal operations of an authentication challenge system in greater detail, in an embodiment of the present disclosure, considering FIGS. 4-5 in context.

FIG. 6 illustrates internal operations of an authentication challenge system in greater detail, in an embodiment, considering FIGS. 4-5 in context. As shown there, a developer 470 may use a developer user interface 472 to generate a challenge class description file 475 and provide that to a challenge creation system 450, which may comprise a challenge generator 658 that receives input value selections from an input value selector 662 and models from a model store 660. With this approach, challenge creation system 450 can generate a large number of CDOs 664 from challenge class description file 475 and those can be stored into a CDO storage 460.

A challenge server 606 may send a CDO request message 672 to CDO storage 460, perhaps in response to a user's challenge request. CDO storage 460 may reply to challenge server 606 with a CDO 674. Challenge server 606 may send a user device metadata message 634 to a decision server 602 and get back a challenge decision message 636 indicating whether a user should be challenged. A decision by decision server 602 may be based on rules stored in a rules storage 686, which may be rules as described herein elsewhere, and/or based on user data from a value server and/or an authentication controller.

Attempts to access the protected computer resource may be made by various users. Typically, the operator of the computer resource may want to allow legitimate users to access the computer resource, while blocking bypassers (users who may be attempting to access the computer resource in ways undesired or unintended by the operator, such as being employed to bypass legitimate controls, and/or masquerade as genuinely interested customers) and automated users, such as bots (automated processes that may be attempting to access the computer resource in ways undesired or unintended by the operator). In such cases, the operator may set up the computer resource on a value server and have access to that value server controlled by an authentication access system of an authentication challenge system.

An authentication access system may serve as a gatekeeper to a computer resource protected by the authentication challenge system and/or may provide a recommendation or result to another system that controls the computer resource. Thus, the authentication access system may block what is determined to be an access by an unintended user and allow what is determined to be an access by a legitimate user or may just provide messaging to other systems that may result in such access controls.

Protection of computer resources may comprise giving legitimate users easy access the computer resource while blocking unintended users (e.g., bypassers and bots) or at least making access more difficult for unintended users. The computer resource may be a server providing content (e.g., a web server serving web pages), an e-commerce server, an advertising-supported resource, a polling server, an authentication server, or other computer resource. The computer resource may be data, communications channels, computing processor time, etc. In part, a role of the authentication challenge system is to try and determine what kind of user is attempting an access and selectively put up roadblocks or impediments for unintended users.

A value server may provide computer resources, or access thereto, to a user having a user device. The user device may be a computer device the user uses to connect to the value server. The value server can issue to the user device a demand for the user to successfully complete a challenge before the value server issues to the user the service of value. In some embodiments, the value server sends the user device a message indicating that the user device should contact an authentication challenge system, obtain an access token (which the authentication challenge system would presumably only supply if it deemed the user successful in a challenge), and provide the access token to the value server in order to access desired assets.

The nature of the user device may not be apparent to the value server or other components of the authentication challenge system, but those components may be configured as if the user device is a user device that can be operated by an automated process or by a human process. For example, responses to challenges may be received that could have been generated by an automated process or by a human.

A decision server determines whether a user system is to be challenged and, if so, what class, level, and/or type of challenge to use. The decision server may respond to a request from a value server or a request from a user system, perhaps where the user system is sending the request to the decision server at the prompting of the value server. The value server may send the decision server a set of user properties that may be known to the value server but not necessarily knowable by the decision server. Examples may include a user's history of activity with the value server, transactions the user made on the value server, etc. For example, the value server may indicate to the decision server that certain users are suspicious based on past interactions with the value server and the decision server may use this information to lean towards issuing a challenge, whereas in the value server indicates that a user has behaved normally in the past and is a regular, known user, the decision server may use this information to lean away from issuing a challenge. The decision server can evaluate the user details that the value server provides, along with its own information, and compute a decision. The decision server may also have access to other data about the user or user's device, such as past history from other sources, user properties, a device fingerprint of the user's device, etc. The decision server may determine that the user's device had attempted to automatically solve previous challenges, and therefore decide to issue a challenge that is especially hard to automate. The decision server may decide that no challenge is necessary, that some challenge is necessary, and if necessary, what class, level, and/or type of challenge is warranted. The decision server may store the user properties and details of a present decision, which can be used for making future challenge decisions.

In some embodiments, instead of the value server passing data about the user directly to the decision server, the value server may pass the data via the user device, perhaps in an encrypted form, with the user device forwarding that data to the decision server. If the decision server can decrypt it, but the user device cannot, that allows for secure transmission of that data from the value server to the decision server. Presumably, that would make it difficult for the user device to create a false set of data. In some embodiments where the data passes through the user device, the user device may be directed to pass data back to the decision server if the user device is to obtain access to the value server. In some embodiments, the value server and the decision server may communicate directly. There are various ways the decision server could be alerted to some bypass attempts, in which case the decision server may determine that it is to issue a new challenge, perhaps under the suspicion that the user device has tampered with the data.

The decision server can send a decision message indicating the decision and details to the value server and/or the user device. In the latter case, the decision message may include an identifier that the user device can pass on to the value server. In an embodiment, a value server instructs the user device to make a request to the decision server, the user device makes the request of the decision server, the decision server decides not to issue a challenge and provides the user device with a token that the value server will accept for providing access to the controlled asset, or the decision server decides to issue a challenge and after the user device successfully meets the challenge, a component of the authentication challenge system (the decision server or other component) provides the user device with the token that the value server will accept for providing access to the controlled asset.

A response processor receives challenge details of a challenge and a user response to a challenge and determines whether the challenge is met. In some embodiments, the challenge is deemed met if the user device provides an answer to a challenge query that matches a pre-stored answer to that challenge. The response processor may receive a challenge evaluation data object from another component, where the challenge evaluation data object may include details of the challenge and the user response and reply with a binary answer to whether the response is deemed correct. The reply of the response processor may be to the decision server, which can then store information for future challenges, may be to the user device with a token that the value server would accept, or other options that convey results of a user response evaluation. In some instances, the response processor may provide a reply that is inconsistent with what actually occurred, such as deeming that an automated process is actually a human or that a human authorized user is actually an unauthorized user. However, with a well-designed response processor and other components, such incidents may be infrequent. In some instances, the response processor may initially deem a response to be correct enough to allow for access but may indicate that the user is questionable and that may trigger the decision server to issued additional challenges. This may be useful in the case where a human repetitively attempting access can get the response correct, but still be judged as undesired, and therefore get flagged for more challenges that burn more time in order to render those activities less profitable. In some cases, the response may be correct, but have indicia of automation, such as a response being so quick that it may be from an automated source. In this manner, the decision server can take various factors into play to determine whether to issue a challenge, while the response processor simply outputs a binary decision to allow access or block access. In other variations, the response processor can output a decision that has more than two possibilities. In a specific example, the response processor has three possible responses to a received challenge evaluation data object: "allow the user access to the value server", "deny the user access to the value server", and "issue another challenge."

A challenge server may output and manage challenges, perhaps in the form of challenge data objects. The challenge server may send a challenge data object to a decision server and/or to a user device directly. A challenge data object may have elements that are known to the authentication challenge system but are not conveyed to the user device, such as details used to construct the challenge represented in the challenge data object that may be stored as a set of pre-determined human expectations generated based on a model used to construct the challenge.

A challenge processor, perhaps part of the decision server and/or the response processor, can evaluate details, metadata, etc. of a user response, and assess future risks of interactions with that user, which can then be forwarded to the decision server to help with future decisions about whether to challenge the user.

An authentication access system may be used to control access to the value server, such as in cases where the value server is not configured to request and evaluate tokens from users or user interactions. In such cases, the authentication access system can handle those tasks and interact with the decision server, the response processor, and/or the challenge processor. In a specific implementation, user devices and user computer systems of those user devices can only access the value server via the authentication access system and the value server allows for access from any system that the authentication access system allows through. The authentication access system can then be the gatekeeper of the value server.

Figure 7:
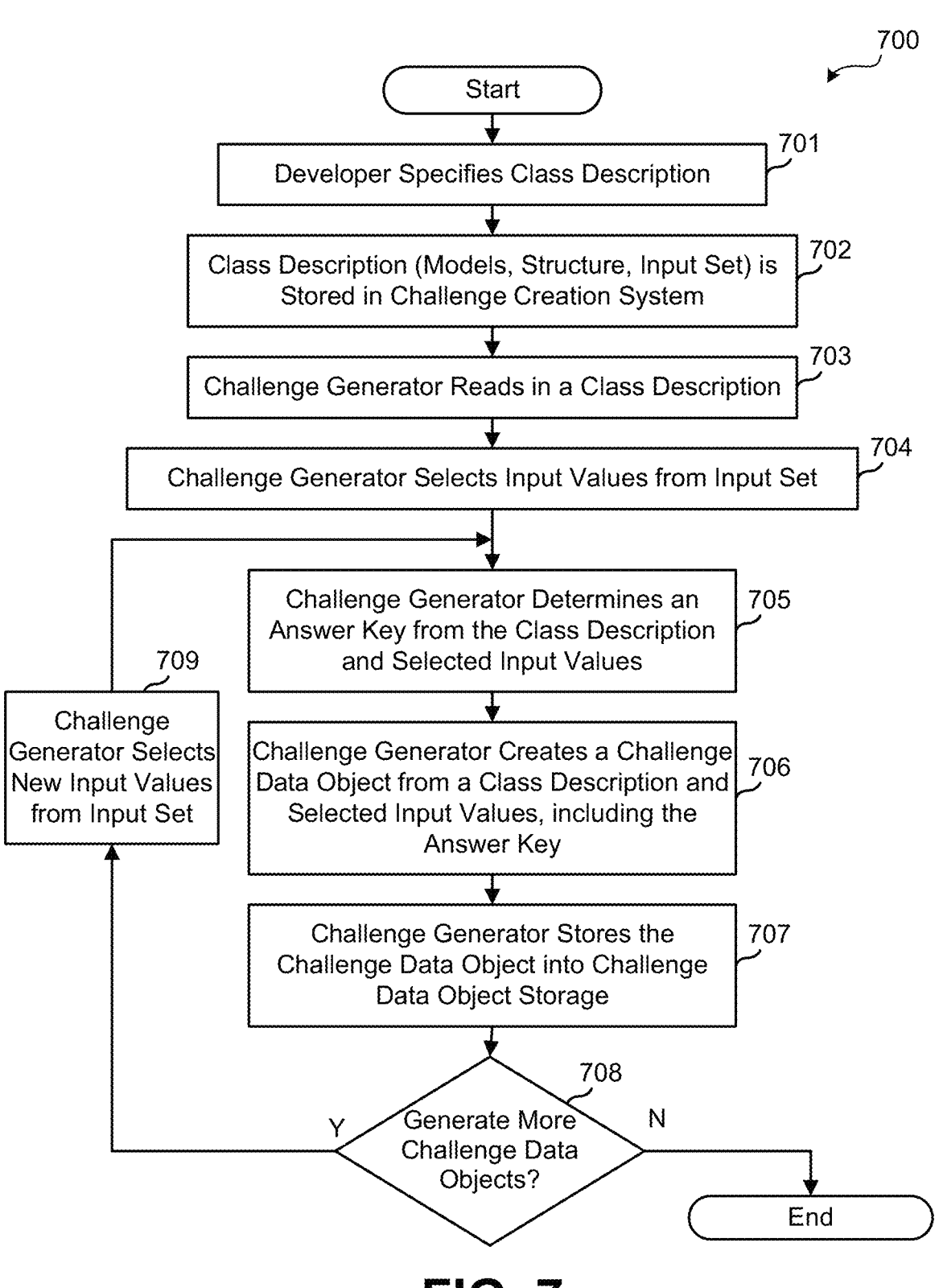
FIG. 7 is a flowchart depicting a method for creation of a class of authentication challenges, according to an embodiment of the present disclosure.

FIG. 7 is a flowchart depicting a method 700 for creation of a class of authentication challenges, according to an embodiment. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., challenge creation system 450 illustrated in FIGS. 4 and 6).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

In method 700, at operation 701, a developer may specify a class description. At operation 702, a class description (models, structure, input set) is stored in a challenge creation system. At operation 703, a challenge generator reads in a class description, and at operation 704, the challenge generator selects input values from an input set. At operation 705, the challenge generator determines an answer key from the class description and the selected input values. At operation 706, the challenge generator creates a challenge data object from the class description and selected input values, including the answer key. At operation 707, the challenge generator stores the challenge data object into a challenge data object storage. At operation 708, the challenge generator determines whether to generate more CDOs. If so, at operation 709, the challenge generator selects new input values from an input set and loops back to operation 705. If not, the process terminates or proceeds to another class description.

In a particular embodiment, models correspond to tiles, and images that form part of presentations are concatenations of tiles. In some embodiments, the boundaries of the tiles are clear (e.g., ten distinct images are illustrated) but in other challenges, the images corresponding to different answer options are not presented as clearly delineated tiles to the user devices, but may be a singular scene built of multiple objects where the boundaries are known only to the authentication server. Thus, in some embodiments, the CDO data that the user device receives may not have a clear indication of boundaries and that may be left to the user to discern, as needed, making automated processing harder.

An authentication challenge, according to an embodiment, may proceed as described herein using the generated CDOs. A challenge may involve a user interacting with a two-dimensional (2D) rendering and/or a two-dimensional (2D) rendering of a three-dimensional (3D) virtual object with properties that match a challenge request.

For example, the challenge request may present a challenge and/or question, the answer to which may be selected from the rendered 2D images. As an example, the challenge may request the user to select one or more figures that match a particular condition (e.g., "select all of the images that include a bicycle"). In some embodiments, the challenge may request the user to interact with the images to place them in a position and/or configuration that matches a particular challenge configuration (e.g., rotate a figure a certain number of times). These scenarios are merely examples, and the embodiments of the present disclosure are not limited to such examples. Many different types of examples are possible without deviating from the scope of the present disclosure.

Figure 8A:
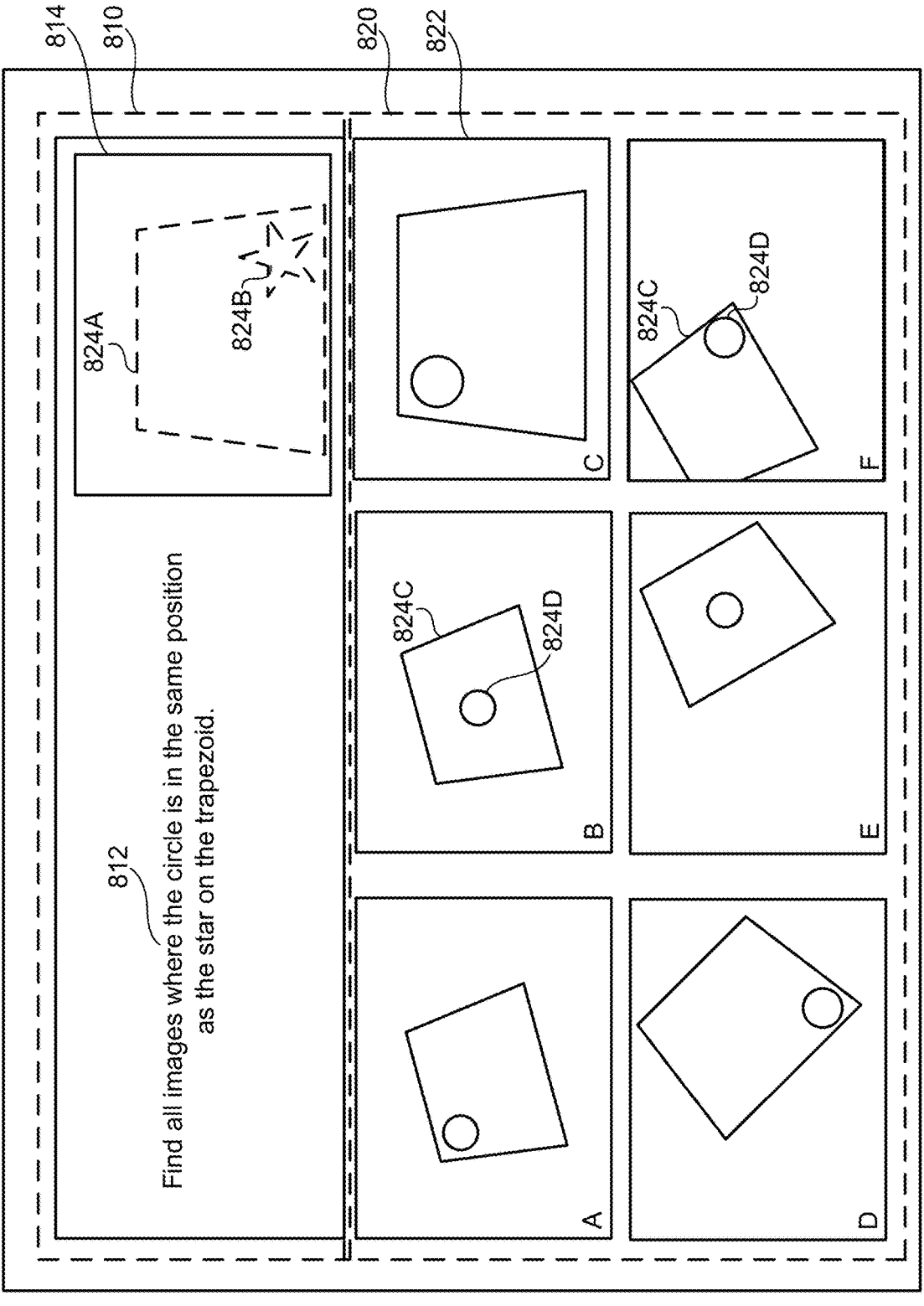
FIG. 8A illustrates an example of a challenge user interface according to some embodiments of the present disclosure.

FIG. 8A illustrates an example of a challenge user interface 800A according to some embodiments of the present disclosure. In some embodiments, the challenge user interface 800A may be constructed from a CDO that is generated utilizing techniques described herein. Referring to FIG. 8A, the challenge user interface 800A may include a challenge request area 810 and a challenge response area 820.

The challenge request area 810 may include a challenge text 812. In some embodiments, the challenge text 812 may render the challenge and/or instruction in a readable form. For example, the challenge text 812 may provide an explanation of a task to be performed or a question to be answered utilizing the challenge response area 820. In some embodiments, the challenge text 812 may provide or explain a challenge to be solved as part of interacting with the challenge user interface 800A.

In some embodiments, a challenge key 814 may be provided in the challenge request area 810. The challenge key 814 may provide additional detail for solving the challenge described by the challenge text 812. In some embodiments, the challenge key 814 may be an image. In some embodiments, the challenge text 812 may direct the user to select one or more images in the challenge response area 820 that conform to one or more aspects of the challenge key 814. In some embodiments, the one or more aspects of the challenge key 814 that are to be matched are indicated by the challenge text 812. In some embodiments, the challenge key 814 may direct the user to select the one or more images in the challenge response area 820 based in part on a relative position of elements within the one or more images.

In some embodiments, the challenge key 814 may include one or more elements. For example, the challenge key 814 may include a first element 824A and a second element 824B. In some embodiments, at least a portion of the second element 824B may overlap the first element 824A, though the embodiments of the present disclosure are not limited thereto. In some embodiments, the first element 824A may not have rotational symmetry (e.g., may be rotationally asymmetric). That is to say that the first element 824A may have a unique shape as it rotated so that no rotated position of the first element 824A looks like another rotated position. The lack of rotational symmetry may allow the layout of the first element 824A to be identified (e.g., by a human) regardless of which way the first element 824A is rotated. As a result, a relative position of the second element 824B with respect to the first element 824A may also be identified regardless of which way the first element 824A is rotated.

The challenge response area 820 may contain one or more images 822. The one or more images 822 may render or display a particular scene including one or more elements. For example, the images 822 may include a third element 824C and a fourth element 824D. The third element 824C and the fourth element 824D may correspond and/or be associated with the first element 824A and the second element 824B, respectively. In some embodiments, the third element 824C may not have rotational symmetry (e.g., may be rotationally asymmetric). In some embodiments, in different ones of the images 822, the third element 824C and/or the fourth element 824D may be placed in different positions within the image 822 and/or may be positioned in different orientations from other ones of the images 822.

In some embodiments, in the one or more images 822, the fourth element 824D may be positioned differently with respect to the third element 824C. Thus, in different ones of the images 822, both the third element 824C and the fourth element 824D may be in different positions. Nonetheless, a human user may be able to detect a relative positioning of the fourth element 824D with respect to the third element 824C, despite the different orientations and/or positions of the third and fourth elements 824C, 824D.

In some embodiments, at least one of the images 822 may illustrate the third and fourth elements 824C, 824D in a same orientation as the first and the second elements 824A, 824B in the challenge key 814. For example, in FIG. 8A the images 822 containing text D and F may illustrate the third and fourth elements 824C, 824D in a same orientation relative to one another as the first and the second elements 824A, 824B in the challenge key 814. Stated another way, a correct image 822 may illustrate the third element 824C oriented with respect to the fourth element 824 in a same way as the first element 824A is oriented with respect to the second element 824B. As used herein, a same relative orientation does not require that the third and fourth elements 824C, 824D have an exact same offset from one another and/or be placed in a same position as the first and second elements 824A, 824B. In some embodiments, the third and fourth elements 824C, 824D may be in a same orientation relative to one another as the first and the second elements 824A, 824B even though the third and fourth elements 824C, 824D are arranged in different positions and/or orientations within the plurality of images 822 than the first and the second elements 824A, 824B and/or even though one or more of the third and fourth elements 824C, 824D are different shapes and/or sizes than the first and the second elements 824A, 824B. For example, in FIG. 8A, the challenge key 814 illustrates the first element 824A as a trapezoid and the second element 824B is a star, and the second element 824B (the star) is in a lower right corner of the first element 824A (the trapezoid).

In the images 822 of the challenge response area 820, the third element 824C is illustrated as a trapezoid and the fourth element 824D is illustrated as a circle. As illustrated, the matching images 822 (D and F) illustrate the fourth element 824D in a lower right corner of the third element 824C even though the third and fourth elements 824C, 824D are not oriented in the same direction and/or are not the same size as the challenge key 814, and the fourth element 824D of the images 822 is illustrated as a different shape than the second element 824B of the challenge key 814 (a star versus a circle). In some embodiments, a portion of one or more of the third and fourth elements 824C, 824D may be obscured in the image 822 as in the image 822 labeled with the text F.

Despite the differing arrangements between the third and fourth elements 824C, 824D of the images 822 and the first and second elements 824A, 825B of the challenge key 814, as well as the different shapes of the second element 824B of the challenge key 814 and the fourth element 824D of the images 822, a human can still detect the correct orientation. In contrast, an automated image recognition system configured to detect and/or classify a particular problem may have difficulty interpreting the different relative orientations and/or shapes between the first and second elements 824A, 824B and the third and fourth elements 824C, 824D.

In some embodiments, the first and second elements 824A, 824B may be illustrated in the challenge key 814 in a different manner than the third and fourth elements 824C, 824D. For example, the first and second elements 824A, 824B of the challenge key 814 may be illustrated in a stylized and/or abstract manner, while the third and fourth elements 824C, 824D of the images 822 may be illustrated using colors, detail, shading, and the like that are different from the first and second elements 824A, 824B. In some embodiments, the first and second elements 824A, 824B may be illustrated in the challenge key 814 in a 2D perspective, and the third and fourth elements 824C, 824D of the images 822 may be illustrated in a 3D perspective. As an example, in FIG. 8A the first and second elements 824A, 824B are illustrated utilizing a dashed line while the third and fourth elements 824C, 824D of the images 822 are illustrated using solid lines. This different way of illustration is merely an example, and one of ordinary skill in the art will recognize that other types of differentiation are possible without deviating from the scope of the present disclosure. In some embodiments, challenge text 812 may provide the user with a way to compare the first and second elements

824A, 824B of the challenge key 814 with the third and fourth elements 824C, 824D of the images 822. For example, the challenge text 812 of FIG. 8A references the star of the challenge key 814 as compared to the circle of the images 822. The challenge text 812 may indicate the correspondence between the first and second elements 824A, 824B of the challenge key 814 and the third and fourth elements 824C, 824D of the images 822, such that a human interacting with the challenge user interface 800A may be capable of establishing the correct desired orientation, but an automated image classification system may have difficulty.

Though the images 822 in FIG. 8A illustrate only the third and fourth elements 824C, 824D, this is merely an example. In some embodiments, the images 822 may contain additional elements in addition to the third and fourth elements 824C, 824D. A human eye may still be able to discern the orientation of the third and fourth elements 824C, 824D despite the presence of other elements of the image 822.

Figure 8B:
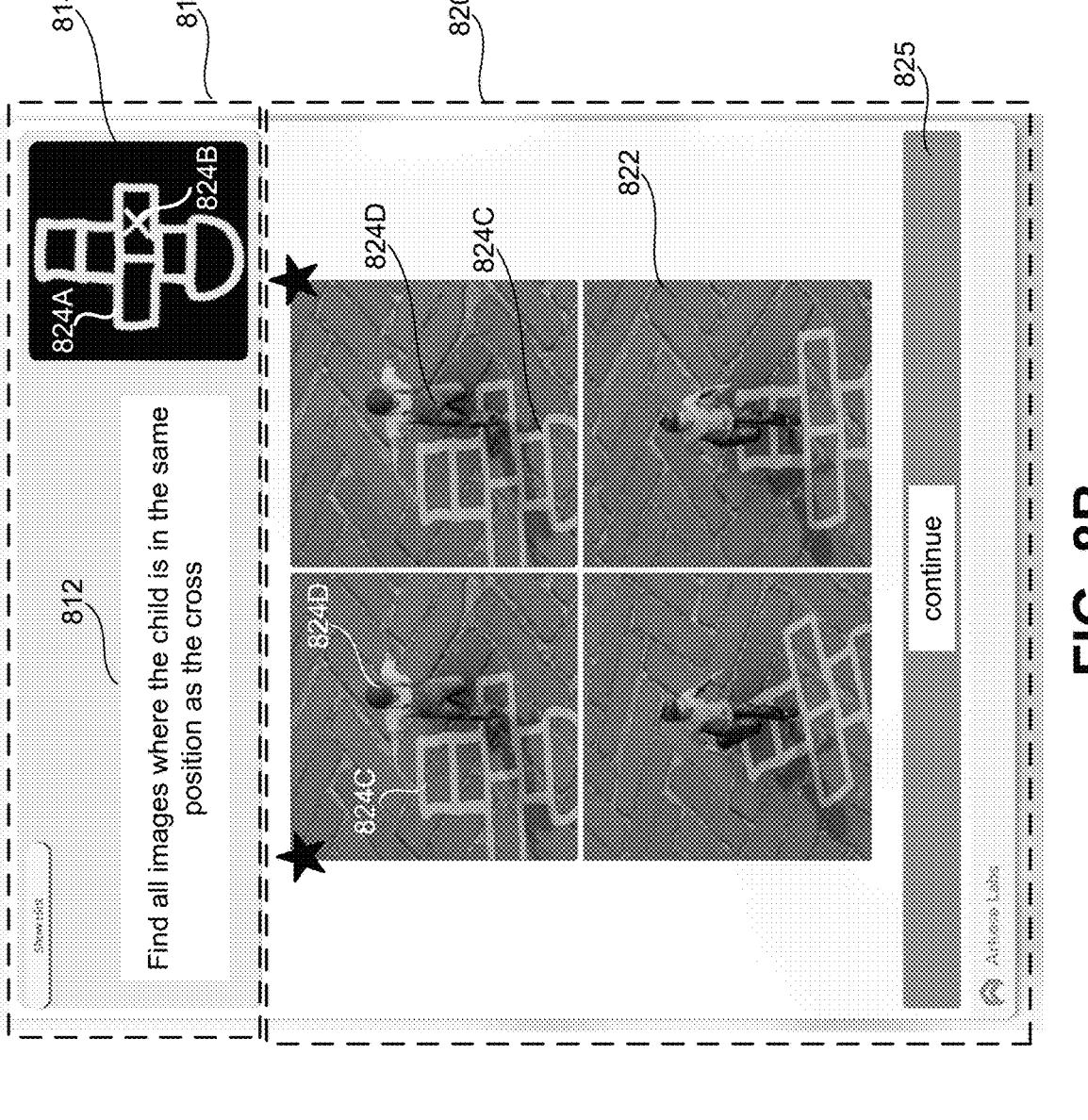
FIG. 8B is an example of a challenge interface illustrating examples of first and second elements and third and fourth elements according to some embodiments of the present disclosure.

FIG. 8B is an example of a challenge interface 800B illustrating examples of first and second elements 824A, 824B and third and fourth elements 824C, 824D according to some embodiments of the present disclosure. A description of elements of FIG. 8B that have been previously described (e.g., with respect to FIG. 8A) will be omitted for brevity.

Referring to FIG. 8B, the challenge key 814 illustrates a stylized illustration of a hopscotch grid as the first element 824A and a stylized illustration of a cross as the second element 824B. In the challenge key 814, the second element 824B (the cross) is illustrated in a particular orientation (in a particular box) with respect to the first element 824A (the hopscotch grid).

In the challenge response area 820, a plurality of images 822 each illustrate a photo-realistic image of a hopscotch configuration as the third element 824C and a photo-realistic image of a child as the fourth element 824D. In some of the images 822, the third element 824C (the hopscotch configuration) is illustrated in different orientations. In some of the images 822, portions of the third element 824C (the hopscotch configuration) are obscured.

In some of the images 822, the fourth element 824D (the child) is located at different orientations with respect to the third element 824C (the hopscotch configuration). That is to say that the child is illustrated in different ones of the hopscotch boxes. Nonetheless, a human user is able to determine in which of the images 822, the fourth element 824D (the child) is arranged in a same orientation with respect to the third element 824C (the hopscotch configuration) as an orientation of the second element 824B (the cross) with respect to the first element 824A (the hopscotch grid) in the challenge key 814. Stated another way, the relative orientation of the first and second elements 824A, 824B with respect to one another is the same as the relative orientation of the third and fourth elements 824C, 824D with respect to one another.

The challenge text 812 may provide the correspondence between the first, second, third, and fourth elements 824A, 824B, 824C, 824D. For example, the challenge text 812 of FIG. 8B asks the user to select all images where the child in the images 822 is in the same position as the cross in the challenge key 814. Thus, the challenge text 812 establishes a correspondence (e.g., a relative orientation to be used to solve the challenge) between the second element 824B of the challenge key 814 and the fourth element 824D of the images 822. To successfully solve the request, the user is to manipulate the challenge user interface 800B to select the images 822 in which the third and fourth elements 824C,

824D match a relative orientation with respect to one another as the first and second elements 824A, 824B of the challenge key 814. In some embodiments, the user may select the continue interface 825 to submit the responses. In the example of FIG. 8B, the correct images of the images 822 are the top row of the images 822 (marked with a star in FIG. 8B for illustrative purposes only; a star may not be present in a user interface 800B presented to the user), where the two images each show the child in a same box of the hopscotch configuration as the cross in the hopscotch grid of the challenge key 814.

In response to submitting the responses, the selected images 822 may be submitted as a response to the challenge request (e.g., as a challenge response 224, 324 of FIGS. 2 and 3). The response may be processed, as described herein, by an authentication challenge system to determine if the submitted response is correct, and the authentication may proceed accordingly, as described herein.

In FIGS. 8A and 8B, the relative orientation of the challenge key 814 was illustrated using images, including first and second elements 824A, 824B that may be used to illustrate the relative orientation to be used to solve the challenge. However, embodiments of the present disclosure are not limited to such a configuration. In some embodiments, the challenge key 814 may indicate the relative orientation to be used to solve the challenge through text or other symbols, such as a coordinate mapping.

Figure 8C:
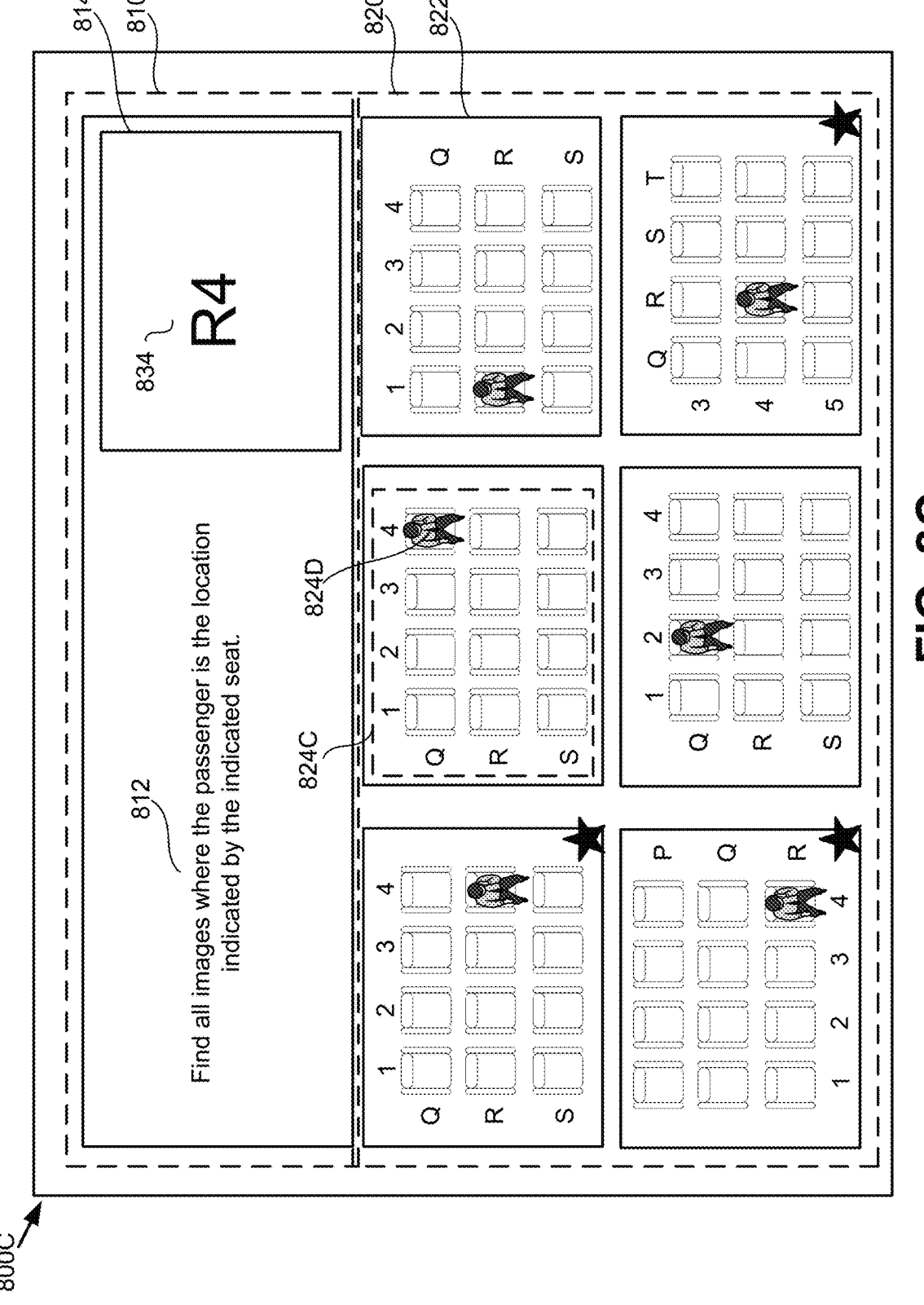
FIG. 8C is an example of a challenge interface illustrating an example of using a coordinate mapping to identify a relative orientation of elements, according to some embodiments of the present disclosure.

FIG. 8C is an example of a challenge user interface 800C illustrating an example of using a coordinate mapping to identify a relative orientation of elements, according to some embodiments of the present disclosure. A description of elements of FIG. 8C that have been previously described (e.g., with respect to FIGS. 8A and 8B) will be omitted for brevity.

Referring to FIG. 8C, the challenge text 812 may direct the user to identify one or more of a plurality of images 822 that illustrate a fourth element 824D (in the example of FIG. 8C, a stylized person) in a same relative orientation to a third object element (in the example of FIG. 8C, a grid of seats) as indicated by the challenge key 814.

The challenge key 814 illustrates a coordinate location 834 that identifies a location of and/or within the third element 824C. To match the challenge key 814, the user is to identify those of the plurality of images 822 that illustrate the fourth element 824D at the relative orientation with respect to the third element 824C that is indicated by the coordinate location 834 of the challenge key 814.

In the example of FIG. 8C, the coordinate location 834 is provided in a grid notation while the third element 824C is provided as a grid with a similar grid notation. For example, the third element 824C may be provided as a plurality of rows and columns of locations (e.g., seats in the example of FIG. 8C), where each of the rows may have a first notation element (e.g., a letter or a number) and each of the columns may have a second notation element (e.g., a number or letter). Thus, the example of coordinate location 834 of "R4" may indicate the intersection of a row (or column) labelled with the first notation element (e.g., "R") and a column (or row) labelled with the second notation element (e.g., "4"). The coordinate notation of FIG. 8C is merely an example, and one of ordinary skill in the art will recognize that other examples are possible without deviating from the embodiments of the present disclosure. For example, though letters and numbers are used for the notation elements of coordinate location 834, in some embodiments, the coordinate location 834 may be combinations of colors, shapes, icons, or other symbols.

In the challenge response area 820, a plurality of images 822 each illustrate variations of the third element 824C (e.g., the seats), with the fourth element 824D (e.g., the person) placed at different relative orientations within the third element 824C (e.g., within different seats). As illustrated in FIG. 8C, in some of the images 822, different portions of the grid of the third element 824C may be illustrated. For example, in some embodiments, the grid of the third element 824C may include a first set of rows (e.g., Q, R, and S in the upper left image) in one of the images 822 and the grid of the third element 824C may include a second set of rows (e.g., P, Q, and R in the lower left image) in another one of the images 822. In some embodiments, the first notation element of the coordinate element (e.g., R) may refer to rows of the third element 824C (e.g., as in the upper left image) in one of the images 822 while the first notation element of the coordinate element (e.g., R) may refer to columns of the third element 824C (e.g., as in the lower right image) in another one of the images 822.

The use of a grid coordinate system allows for a number of solution combinations to be generated quickly. For example, a plurality of different grid configurations may be utilized for different third elements 824C of the images 822, a plurality of coordinate locations 834 may be selected for different challenge keys 814, and the fourth element 824D can be placed in a plurality of different locations within the grids of the third element 824C. Nonetheless, a human user is able to determine which of the images 822 correctly represents the fourth element 824D (e.g., the person) arranged in a same orientation with respect to the third element 824C (e.g., the grid of seats) as indicated by the coordinate location 834 in the challenge key 814. Stated another way, the relative orientation of the third and fourth elements 824C, 824D with respect to one another may be indicated by the coordinate location 834 in the challenge key 814.

The challenge text 812 may provide the correspondence between the coordinate location 834 and the third and fourth elements 824C, 824D. For example, the challenge text 812 of FIG. 8C asks the user to select all images 822 where the person in the images 822 is in the same position within the seats as the coordinate location 834 in the challenge key 814. Thus, the challenge text 812 establishes a correspondence (e.g., a relative orientation to be used to solve the challenge) between the coordinate location 834 of the challenge key 814 and the relative orientation of the fourth element 824D in the third element 824C within the images 822. To successfully solve the request, the user is to manipulate the challenge user interface 800C to select the images 822 in which the third and fourth elements 824C, 824D match a relative orientation with respect to one another as indicated by the coordinate location 834 of the challenge key 814. In the example of FIG. 8C, the correct images of the images 822 include the upper left image 822, the lower left image 822, and the lower right image 822 (marked with a star in FIG. 8C for illustrative purposes only; a star may not be present in a challenge user interface 800C presented to the user), where the three images each show the person seated at seat R4 within the seat grid as indicated by the coordinate location 834 of the challenge key 814. Though not illustrated in FIG. 8C, the user may select a continue and/or submit interface to submit the responses.

In response to selecting the images 822, the selected images 822 may be submitted as a response to the challenge request (e.g., as a challenge response 224, 324 of FIGS. 2 and 3). The response may be processed, as described herein, by an authentication challenge system to determine if the submitted response is correct, and the authentication may proceed accordingly, as described herein.

Though FIGS. 8A, 8B, and 8C illustrate examples in which an image 822 is selected from a plurality of images, the embodiments of the present disclosure are not limited to such a configuration. In some embodiments, for example, a single image 822 may be illustrated and the user may be asked if the single image 822 matches the challenge key 814.

Figure 8D:
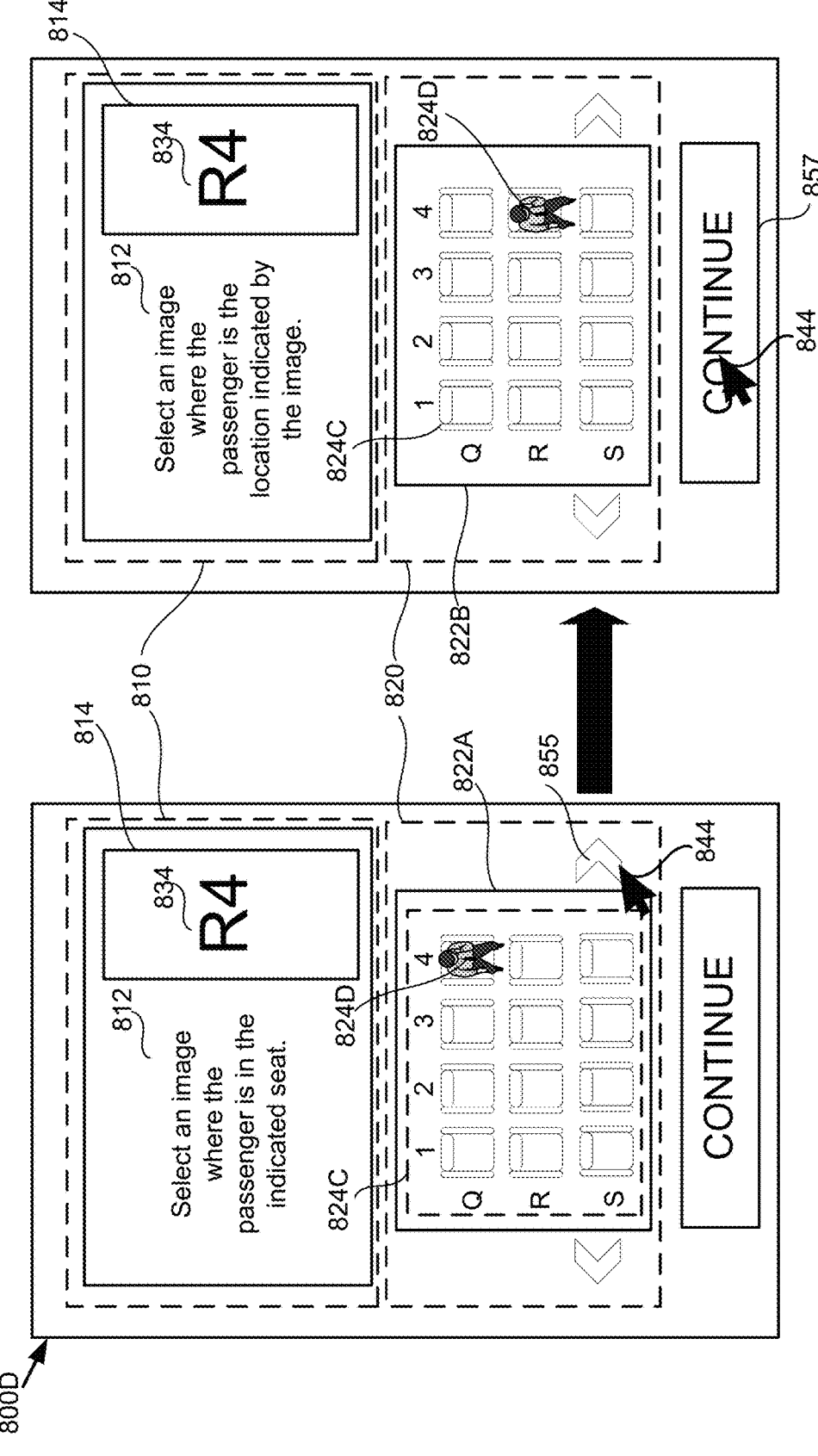
FIG. 8D illustrates an example of a challenge user interface incorporating a single image according to some embodiments of the present disclosure.

FIG. 8D illustrates an example of a challenge user interface 800D incorporating a single image 822 according to some embodiments of the present disclosure. A description of elements of FIG. 8D that have been previously described (e.g., with respect to FIGS. 8A to 8C) will be omitted for brevity.

FIG. 8D includes an arrangement of third and fourth elements 824C, 824D similar to that of FIG. 8C. Namely, in FIG. 8D, the challenge key 814 illustrates a coordinate location 834 that identifies a location of and/or within the third element 824C. To match the challenge key 814, the user is to identify an image 822A, 822B that illustrates the fourth element 824D at the relative orientation with respect to the third element 824C that is indicated by the coordinate location 834 of the challenge key 814.

In the example of FIG. 8D, the coordinate location 834 is provided in a grid notation while the third element 824C is provided as a grid with a similar grid notation. For example, the third element 824C may be provided as a plurality of rows and columns of locations (e.g., seats in the example of FIG. 8D), where each of the rows may have a first notation element (e.g., a letter or a number) and each of the columns may have a second notation element (e.g., a number or letter). Thus, the example of coordinate location 834 of "R4" may indicate the intersection of a row (or column) labelled "R" and a column (or row) labelled "4". The coordinate notation of FIG. 8D is merely an example, and one of ordinary skill in the art will recognize that other examples are possible without deviating from the embodiments of the present disclosure.

Unlike FIG. 8C, the challenge user interface 800D may have a challenge response area 820 that illustrates a single image 822A, 822B at a time. The user may be asked to identify whether the relative orientation of the third element 824C with respect to the fourth element 824D in the illustrated image 822A, 822B matches that indicated by the coordinate location 834. The user may be able to navigate through a plurality of images 822A, 822B by utilizing an interface operation 844 (e.g., a mouse click, touch, or other type of user interface selection) on an image control interface 855.

In FIG. 8D, the first image 822A on the left within the challenge user interface 800D does not match the coordinate location 834 of the challenge key 814 because the fourth element 824D is not located at grid location "R4" within the third element 824C. The user may perform the interface operation 844 on the image control interface 855 to advance to a second image 822B, illustrated in the right side of FIG. 8D.

As illustrated in FIG. 8D, the second image 822B provides a different relative orientation of the third element 824C and the fourth element 824D. Namely, the fourth element 824D (e.g., the person) is located within the third element 824C (e.g., the seats) at location "R4" which matches the coordinate location 834. Responsive to determining that the relative orientation of the fourth element 824D with respect to the third element 824C matches the coordinate location 834, the user may perform the interface operation 844 to select a "CONTINUE" interface element

857. The response may be processed, as described herein, by an authentication challenge system to determine if the submitted response is correct, and the authentication may proceed accordingly, as described herein.

The user may perform multiple interface operations 844 on the image control interface 855 to advance to different images 822 of a plurality of images 822. In some embodiments, the plurality of images 822 may be generated prior to generating the challenge user interface 800D, but the embodiments of the present disclosure are not limited to such a configuration. In some embodiments, an image 822 may be generated when the interface operation 844 selects the image control interface 855.

The embodiment of FIG. 8D may provide a smaller challenge user interface 800D that may be useful for smaller displays, such as smart phones or tablets. In some embodiments, a challenge system may be configured to switch between a challenge user interface 800C such as in FIG. 8C in which multiple images 822 are displayed and a challenge user interface 800D such as in FIG. 8D in which a single image 822A, 822B is displayed.

Figure 9:
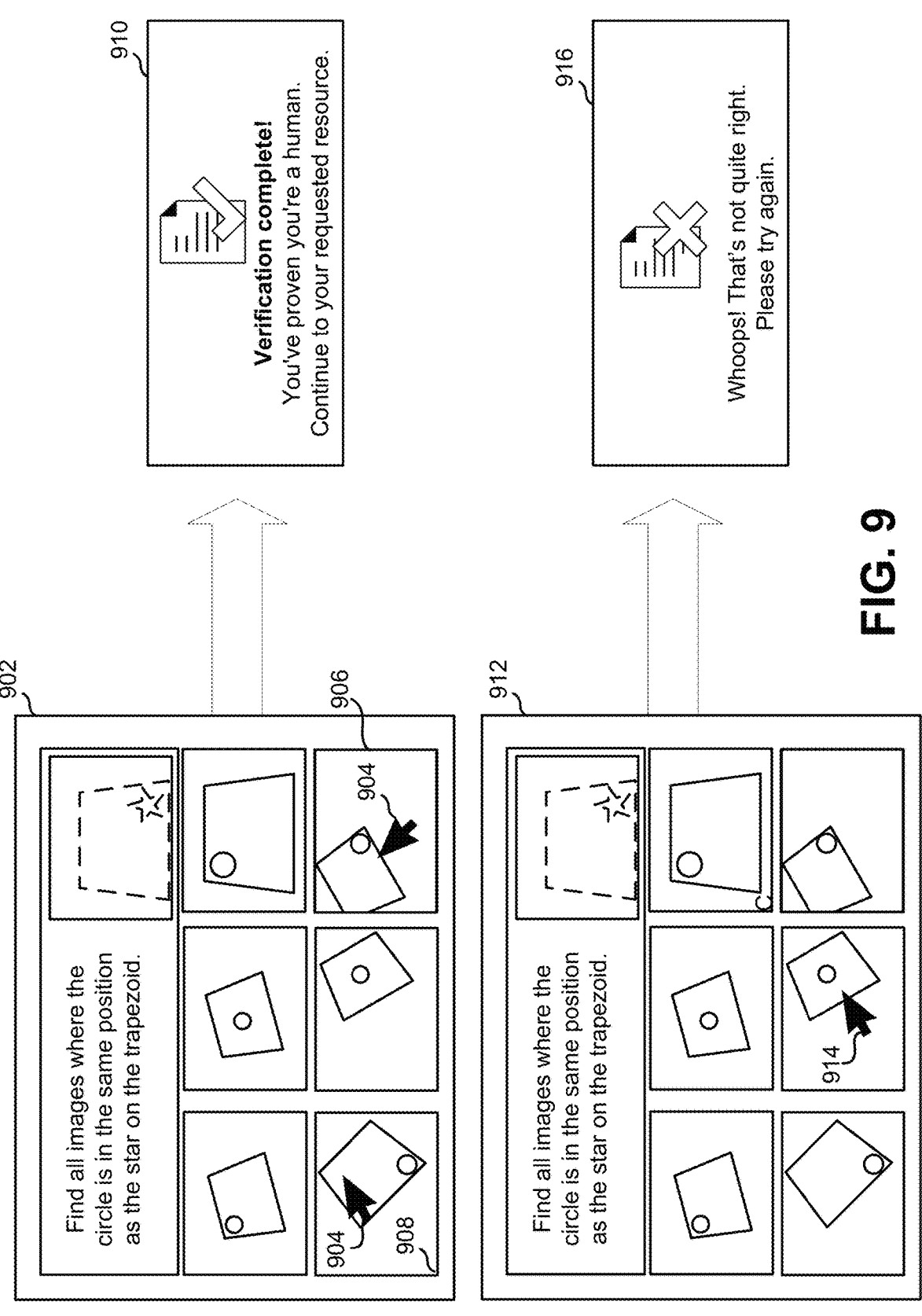
FIG. 9 depicts an example of an operation of checking user responses, according to an embodiment of the present disclosure.

FIG. 9 depicts an example of an operation of checking user responses. A challenge creation system may be used to create challenges that are to be presented to users. The challenge creation system may include a 3D modelling system that performs tasks that enable a challenge creator to create, manipulate, and render virtual objects in creating the challenges. A challenge may be stored electronically as a data object (e.g., a CDO, as described herein) having structure, such as program code, images, parameters for their use, etc. The challenge server may be provided a set of these data structures and serve them up as requested.

In the illustration of FIG. 9, a challenge presentation may be in the form of challenge image 902, in which the user is expected to move their pointer 904 to the lower right tile 906, as that is a tile depicting the shapes in the same orientation as the challenge key. A response to that selection may be the success message 910. In some embodiments, the user must select all of the matching images. In such embodiments, the user is expected to also move their pointer 904 to select other matching images, such as the lower left tile 908 in order to receive the success message 910.

On the other hand, if the user is presented with a challenge presentation in the form of challenge image 912, and the user points to and selects a tile 914 having an image that does not match the relative orientation of the challenge key, the user may receive a fail message 916 and, in some embodiments, may be allowed to try again.

In some embodiments, the challenge creation system can create a large number of different challenges from small variations. By being able to create a large number of distinct challenges from a single class, the ratio of effort by challenge creators and users can be kept low. Ideally, the variations of the challenges are not such that a computer process can easily process any one of those to guess the correct human expectation of the challenge.

A challenge creator, such as a 3D artist, puzzle maker, or other challenge creator, may use a modelling program to create one or more virtual objects and give each one various visual properties, for example shape, texture, and animation routine. A challenge creator may give each virtual object some simulated physical properties, for example flexibility, bounciness, transparency, weight, and friction. The challenge creator can then use the modelling program to create a virtual scene in which various virtual objects can be placed and manipulated.

The challenge creator can use the modelling program to create a virtual camera that surveys the virtual scene. The camera may be in an arbitrary position and aimed in an arbitrary direction, within constraints specified by the challenge creator.

The challenge creator can use the modelling program to create virtual lights that light up the virtual scene and the virtual objects within it, producing shades of color and texture, shadows, highlights, and reflections. The lights may be in arbitrary positions and aimed in an arbitrary direction, perhaps within constraints specified by the challenge creator.

The challenge creator can direct the modelling program to render a series of images (2D or otherwise) that are captured by the virtual camera, showing the virtual objects in the virtual scene lit by the virtual lights. The images can represent a sequence over time, so that as the objects move, each image shows the objects in a different position. This rendering process produces an animated image sequence comprising one or more frames, each frame rendered in sequence over time. The modelling program can also produce a list of properties that the virtual objects have. The list may include the property of correctness, this being whether the image was produced from a set of virtual objects that either do or do not serve as a correct answer to a question that demands whether the objects satisfy a specific criterion. If the virtual objects satisfy the criterion, the image is associated with a property of "correct." If the virtual objects do not satisfy the criterion, the image is associated with a property of "incorrect." The modelling program stores and associates the image and the list of properties of the virtual objects in the scene, including the property of correctness, possibly in the form of an answer key that a computer process can compare to user responses to prompts presented to the user. As images are stored as part of a data structure representing a challenge, one data element may be the images' correctness property.

A challenge may comprise a presentation (what is to be shown to the user), a model from which the presentation is generated, possibly input parameters for varying what is generated from the model, a set of human expectations that are generated from the model (and are likely determinable from the model but not readily determinable from the presentation without the addition of human mental processing), a criterion related to the presentation, and what would constitute a correct response. The input parameters may be selected from a set of possible input values. A criterion may comprise a prompt or a question (e.g., challenge text 812), whether explicit or implicit, that is provided to the user along with the presentation and to which the user is expected to respond to. In operation, a challenge generator may generate a challenge from a known model for a class of challenges, having a known correct response that corresponds to the known set of human expectations about the model, so that a challenge processor can easily evaluate whether a user's response is consistent with the presentation and the criterion. The known correct response, or range of acceptable responses, may be stored in a data element referred to as an answer key. The answer key typically is not available to the user device in a computer processable form but may be easily determined by a human with real-world experience. An answered challenge may be represented by a data structure that comprises the elements of the challenge and the user response to the criterion.

The criterion could be in one or more of various forms. For example, for some challenges, the presentation may be an image constructed from a plurality of tiles, the model used for generating the tiles obtains images that match a particular challenge key, a first parameter of the challenge data object is an indicator of how many tiles are to be included in an image, a second parameter of the challenge data object is an indicator of which of the tiles depict objects match the relative orientations of the challenge key, the criterion is a representation of which of the tiles have the elements in a relative orientation that matches the challenge key, a prompt is "Select which of these images has the third and fourth elements in a same orientation as indicated by the first and second elements of the challenge key", and the known correct response is an indication of which of the images match the challenge key. An image or tile may be a subimage, such that the presentation image shown to the user comprises a plurality of subimages that are combined into one image. In some embodiments, the challenge data object data that the user device receives does not have a clear indication of boundaries between tiles, and that may be left to the user to discern, as needed.

When stored as data, in a challenge data object or otherwise, a criterion may comprise one or more data elements about the presentation or a portion thereof, such as of a tile of a multi-tile image, that indicate a condition or characteristic of the challenge data object (e.g., "the top center tile is the correct one," "in the five-by-five tile array each of the bottom corner tiles are correct and the rest are incorrect," etc.), a prompt that is to be presented to the user ((e.g., "which image shows something that is correct?", "which image shows something that is not correct?", "which of the tiles are correct?", etc.), and an answer key (e.g., one or more index values, such as index values 1-6 where values 1-3 refer to a top row of a three-by-two array and 4-6 refer to a bottom row of the three-by-two array. When a user picks a tile, the tile's index number is conveyed to the challenge server. The challenge server compares the index number given by the user device to the answer key. The criterion could relate to something about a single image, something about multiple images, or an indication of which of a plurality of images have some characteristic. The index values may refer to other aspects of the challenge.

For example, a challenge creation routine may generate a challenge based on a random or arbitrary input number selected from an input set and a model, wherein each selected input number may generate a challenge with a different answer, but all based on the same model. For example, the model may have two elements, and the challenge generation may move one of the element to different defined positions of the other elements to generate the challenge image.

Figure 10:
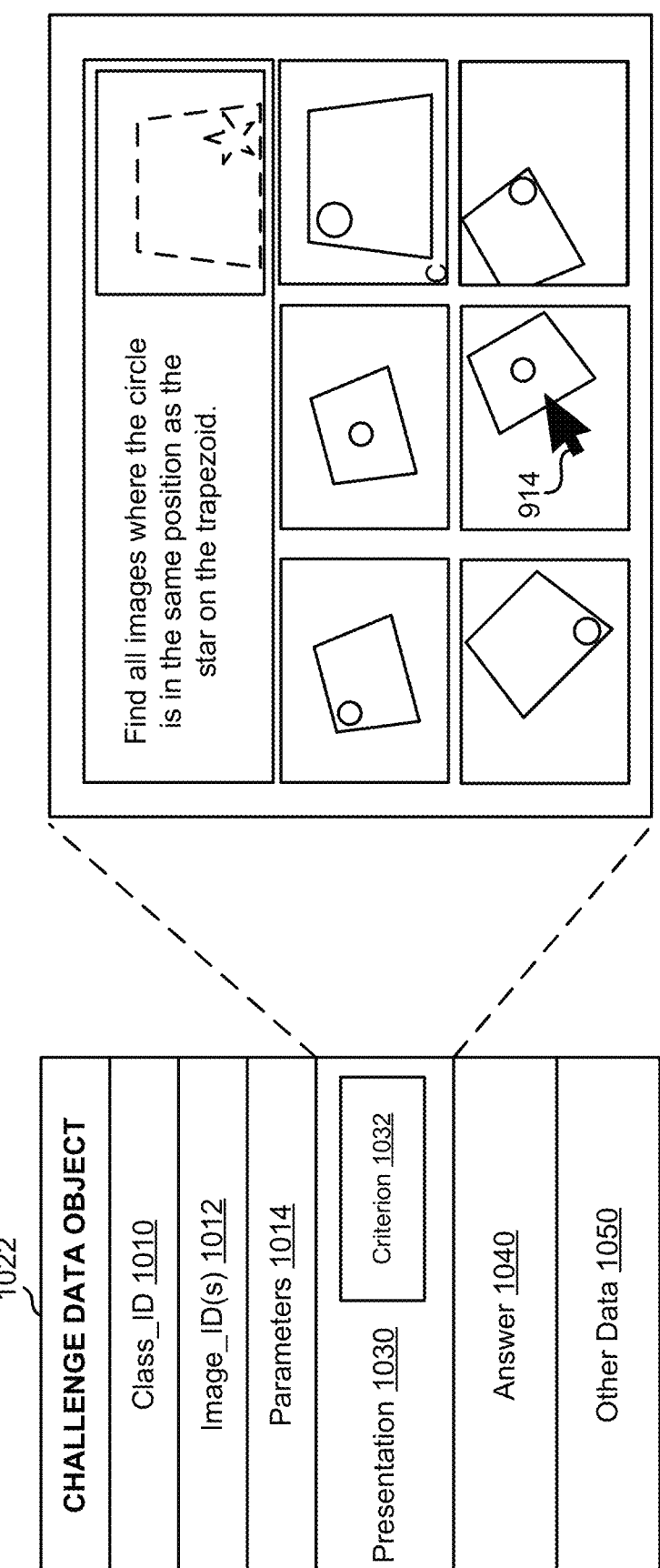
FIG. 10 illustrates an example of a challenge data object, showing an image that may be presented to a user device, data fields indicating criteria to be applied to the image, and other data, according to an embodiment of the present disclosure.

FIG. 10 illustrates an example of a challenge data object 1022, showing an interface that may be presented to a user device, images that may be a part of the interface, data fields indicating properties of the images, and other data. The components of the challenge data object 1022 illustrated in FIG. 10 are merely an example, and, in some embodiments, fewer, more, or different components may be present without deviating from the embodiments of the present disclosure. The challenge data object 1022 may be similar to the CDO 222, 322, and 522 described here.

The challenge data object 1022 may include one or more image ID(s) (Image_ID) 1012 that specify one or more images (e.g., such as images 822 of FIGS. 8A to 8D) included in the challenge presentation. The challenge data object 1022 may also include a class ID (Class_ID) 1010 that describes the type of challenge and how the challenge is to be processed. For example, the class ID 1010 may indicate that the nature of the challenge is to identify images having a same relative orientation as a challenge key. The challenge data object 1022 may also include a parameters description 1014 that describes characteristics of the one or more images and/or the challenge represented by the challenge data object 1022.

The challenge data object 1022 can also include a presentation 1030. The presentation 1030 may indicate how a user interface (e.g., user interface 800A, 800B, 800C, 800D of FIGS. 8A to 8D) is to be illustrated from the one or more images. For example, in some embodiments, a plurality of images may be included as part of the presentation 1030, as in FIGS. 8A to 8C. In some embodiments, one of the images may be illustrated at a time, as in FIG. 8D.

In some embodiments, the presentation 1030 may include a criterion 1032 in the form of a question. A question may be in the form of a selection ("Select one of these N options is matches the challenge key."), may be asking about a property of what is depicted in a presentation 1030, may be about the correctness of what is depicted in a presentation, etc. The question of the criterion 1032 may, in some embodiments, be utilized to form the challenge text 812 illustrated in FIGS. 8A to 8D.

The challenge data object 1022 can also include an answer key 1040. The answer key 1040 may be a separate data field that describes which of the one or more images is (or are) the correct answer to the presentation 1030. The answer key 1040 may be based on the relative orientation selected for the elements of the images as well as the criterion 1032 of the presentation 1032. In some embodiments, the challenge data object 1022 may include other data 1050 that may be used as part of generating the challenge and/or the challenge user interface.

In some embodiments, the challenge data object 1022 is generated by a computer from a source, such as a 3D model or other data, and lacks or obscures source data, as can happen when a 3D virtual scene is represented only by an image of the virtual scene, and that source data that is lacking or obscured data is of the nature that it could be expected that an authorized human user would be able to fill in that lacking or obscured data, at least more easily than an unauthorized human user or an unauthorized bot.

The challenge data object 1022 may comprise images (which may, in some embodiments, be utilized to form the images 822 illustrated in FIGS. 8A to 8D), properties associated with each image, and the criterion 1032 associated with the images. The challenge data object 1022 can include the criterion 1032, at least one image associated with the property of being a correct answer to the criterion 1032, and at least one image associated with the property of being an incorrect answer to the criterion 1032. The challenge server can associate each image with a unique image ID 1012. The challenge server can store each image ID 1012, associated with the list of properties of the image, in the answer key 1040 for the challenge data object 1022, which references which image IDs 1012 are associated with images that satisfy the criterion 1032 and therefore are correct, and which image IDs 1012 are associated with images that do not satisfy the criterion 1032 and therefore are incorrect. The challenge server may assemble the challenge data object 1022. The challenge server may send to the user device the challenge, or part thereof, omitting the answer key 1040 and possibly other elements.

Upon receipt of the challenge data object 1022, the user device may be configured to display to the user the criterion 1032 and the images of a challenge. For example, the challenge user interfaces 800A, 800B, 800C, 800D illustrated in FIGS. 8A, 8B, 8C, and 8D may be generated from the challenge data object 1022. If the image is animated with multiple frames, the frames are each shown in sequence on the user device.

A user may operate an interface of the user device to choose which one or more images satisfy the criterion 1032. The user device can then send the image IDs 1012 of the selected images to the challenge server. The challenge server can compare the image IDs 1012 chosen by the user to the answer key 1040. The challenge server can determine whether the user should receive the service of value (such as access to computer resources) from the value server, and whether the user should complete a new challenge. The determination may be based on whether the user chose images that satisfied the criterion 1032. The challenge server can additionally send a request to the decision server, including the number of correct images the user selected, and the decision server can respond with a new decision. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device.

The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

In a specific embodiment, a system for user authentication includes an authentication server, the authentication server including a processor coupled to a memory, the memory including program code instructions configured to cause the processor to present an authentication challenge to a user of a computing device, the authentication challenge including a number of challenge elements; receive a response to the authentication challenge from the user, the response including a selection of one or more challenge elements in accordance with an instruction to the user on how to complete the authentication challenge; notify the user whether the user's choice of challenge element correctly complied with the instruction or not; and if the user correctly complied with the instruction, allow the user to perform a computer operation.

A computing device for user authentication may include a processor coupled to a memory, the memory including program code instructions configured to cause the processor to present an authentication challenge to a user of a computing device, the authentication challenge including a number of challenge elements; receive a response to the authentication challenge from the user, the response including a selection of one or more challenge elements in accordance with an instruction to the user on how to complete the authentication challenge; notify the user whether the user's choice of challenge element correctly complied with the instruction or not; and if and only if the user's correctly complied with the instruction, allow the user to perform a computer operation.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 11:
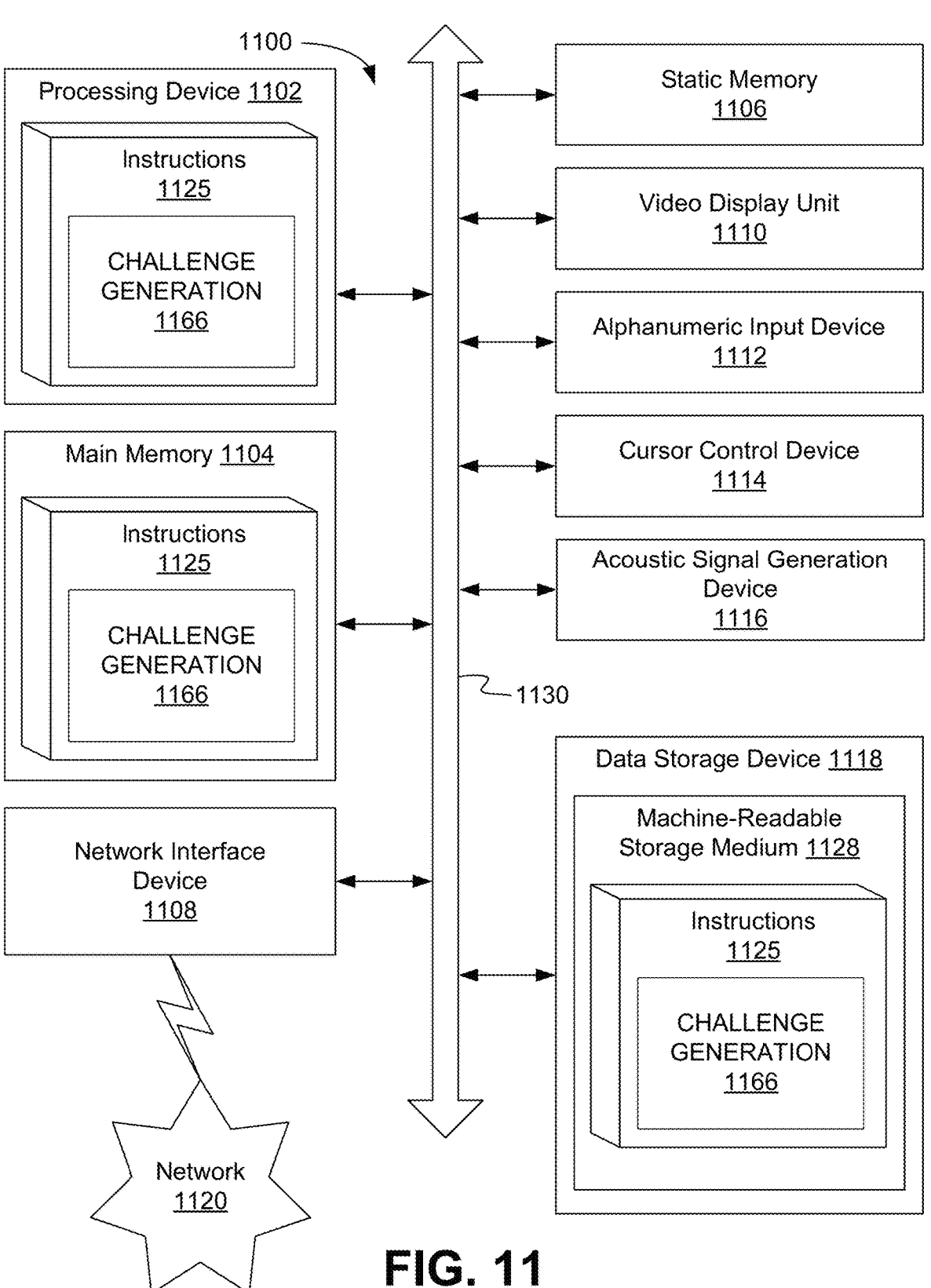
FIG. 11 is a block diagram of an example computing device that may perform one or more of the operations described herein, in accordance with some embodiments of the present disclosure.

FIG. 11 is a block diagram of an example computing device 1100 that may perform one or more of the operations described herein, in accordance with one or more aspects of the disclosure. Computing device 1100 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a non-volatile memory 1106 (e.g., flash memory and a data storage device 1118), which may communicate with each other via a bus 1130.

Processing device 1102 may be provided by one or more general-purpose processing devices such as a microprocessor, central processing unit, or the like. In an illustrative example, processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also include one or more special-purpose processing devices such as an application specific integrated circuit (ASIC), a field programmable gate array (FPGA), a digital signal processor (DSP), network processor, or the like. The processing device 1102 may execute the operations described herein, in accordance with one or more aspects of the present disclosure, for performing the operations and steps discussed herein.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable storage medium 1128 on which may be stored one or more sets of instructions 1125 that may include instructions for a multiplier configuration component, e.g., challenge generation 1166 for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, and magnetic media.

FIG. 12 is a flow diagram of a method 1200 for scheduling a software container, in accordance with some embodiments of the present disclosure. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1200 may be performed by a computing device (e.g., authentication challenge server 206, 306, 406, 506, 606 illustrated in FIGS. 2, 3, 4, 5, 6).

With reference to FIG. 12, method 1200 illustrates example functions used by various embodiments. Although specific function blocks ("blocks") are disclosed in method 1200, such blocks are examples. That is, embodiments are well suited to performing various other blocks or variations of the blocks recited in method 1200. It is appreciated that the blocks in method 1200 may be performed in an order different than presented, and that not all of the blocks in method 1200 may be performed.

Referring simultaneously to the prior figures as well, the method 1200 begins at block 1210, in which a challenge data structure is sent to a user computer system. The challenge data structure defines a challenge to be presented to a user of the user computer system. The challenge involves selecting one or more correct images that conform to one or more aspects of a challenge key from a plurality of images based on a relative orientation with respect to one another of elements within the plurality of images. In some embodiments, the plurality of images may correspond to the plurality of images 822 as described herein with respect to FIGS. 8A to 8D. In some embodiments, the challenge key may correspond to the challenge key 814 as described herein with respect to FIGS. 8A to 8D. In some embodiments, the elements may correspond to one or more of the first element 824A, the second element 824B, the third element 824C, and/or the fourth element 824D, as described herein with respect to FIGS. 8A to 8D.

In some embodiments, the challenge key includes a first element and a second element, respective ones of the plurality of images include a third element and a fourth element, and the one or more correct images that conform to the one or more aspects of the challenge key each illustrate a relative orientation of the fourth element with respect to the third element that matches a relative orientation of the second element with respect to the first element. In some embodiments, the first element and the third element are rotationally asymmetric. In some embodiments, the second element overlaps the first element, and the fourth element overlaps the third element.

In some embodiments, the challenge key includes a coordinate location, respective ones of the plurality of images include a third element and a fourth element, and the one or more correct images that conform to the one or more aspects of the challenge key each illustrate a relative orientation of the fourth element with respect to the third element that matches the coordinate location of the challenge key. In some embodiments, the third element includes a grid pattern, the coordinate location indicates a location within the grid pattern of the third element, the one or more correct images that conform to the one or more aspects of the challenge key each illustrate the fourth element at the location within the grid pattern of the third element indicated by the coordinate location of the challenge key. In some embodiments, where a first grid pattern of a first image of the plurality of images comprises a different orientation of rows and columns than a second image of the plurality of images.

At block 1220, a user response is obtained representing at least one user-selected image from the plurality of images. In some embodiments, the user response may correspond to the challenge response 224, 324, 524, as described herein with respect to FIGS. 2, 3 and 5.

At block 1230, access is provided to a computer resource for the user computer system based on whether the at least one user-selected image is consistent with the one or more correct images. In some embodiments, the access to the computer resource may comprise data from a value server 204, 304, as described herein with respect to FIGS. 2 and 3.

Unless specifically stated otherwise, terms such as "sending," "obtaining," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, the method comprising:

signing information associated with a user computer system to generate signed information;

sending, by a processing device to the user computer system, the signed information to cause the user computer system to send a request for access to a computer resource;

generating, for a user computer system, a challenge data structure defining a challenge to select a correct image that conforms to one or more aspects of a challenge key from a plurality of images based on a relative orientation with respect to one another of elements within the plurality of images;

sending, by the processing device, the challenge data structure to the user computer system to cause the challenge data structure to be presented to a user of the user computer system, wherein the challenge key comprises a first element and a second element and the correct image comprises a third element and a fourth element, wherein the first element corresponds to the third element and the second element corresponds to the fourth element, wherein the first element illustrates a particular shape and the third image illustrates the particular shape with a portion obscured, wherein the first element and the second element of the challenge key are illustrated in a two-dimensional perspective, and the third element and the fourth element of the correct image are a 2D rendering of a three-dimensional (3D) virtual object with properties that match the challenge data structure, wherein the challenge data structure further comprises challenge text that explicitly indicates a correspondence between the second element of the challenge key and the fourth element of the correct image and specifies that the second element and the fourth element are different shapes, and wherein the first element and the second element are presented as line-drawing icons and the third element and the fourth element are presented as a photorealistic rendering;

obtaining a user response representing at least one user-selected image from the plurality of images; and providing access to the computer resource for the user computer system based on whether the at least one user-selected image is consistent with the correct image.

2. The method of claim 1, wherein the correct image that conforms to the one or more aspects of the challenge key each illustrate a relative orientation of the fourth element with respect to the third element that matches a relative orientation of the second element with respect to the first element.

3. The method of claim 2, wherein the first element and the third element are rotationally asymmetric.

4. The method of claim 2, wherein the second element overlaps the first element, and wherein the fourth element overlaps the third element.

5. The method of claim 1, wherein the challenge key comprises a coordinate location, wherein the correct image that conforms to the one or more aspects of the challenge key each illustrate a relative orientation of the fourth element with respect to the third element that matches the coordinate location of the challenge key.

6. The method of claim 5, wherein the third element comprises a grid pattern, wherein the coordinate location indicates a location within the grid pattern of the third element, and wherein the correct image that conforms to the one or more aspects of the challenge key each illustrate the fourth element at the location within the grid pattern of the third element indicated by the coordinate location of the challenge key.

7. The method of claim 6, where a first grid pattern of a first image of the plurality of images comprises a different orientation of rows and columns than a second image of the plurality of images.

8. A computer system comprising:

a memory; and a processing device, operatively coupled to the memory, to:

sign information associated with a user computer system to generate signed information;

send, to the user computer system, the signed information to cause the user computer system to send a request for access to a computer resource;

generate, for a user computer system, a challenge data structure defining a challenge to select a correct image that conforms to one or more aspects of a challenge key from a plurality of images based on a relative orientation with respect to one another of elements within the plurality of images;

send the challenge data structure to the user computer system to cause the challenge data structure to be presented to a user of the user computer system, wherein the challenge key comprises a first element and a second element and the correct image comprises a third element and a fourth element, wherein the first element corresponds to the third element and the second element corresponds to the fourth element, wherein the first element illustrates a particular shape and the third image illustrates the particular shape with a portion obscured, wherein the first element and the second element of the challenge key are illustrated in a two-dimensional perspective, and the third element and the fourth element of the correct image are a 2D rendering of a three-dimensional (3D) virtual object with properties that match the challenge data structure, wherein the challenge data structure further comprises challenge text that explicitly indicates a correspondence between the second element of the challenge key and the fourth element of the correct image and specifies that the second element and the fourth element are different shapes, and wherein the first element and the second element are presented as line-drawing icons and the third element and the fourth element are presented as a photorealistic rendering;

obtain a user response representing at least one user-selected image from the plurality of images; and provide access to a computer resource for the user computer system based on whether the at least one user-selected image is consistent with the correct image.

9. The computer system of claim 8, wherein the correct image that conforms to the one or more aspects of the challenge key each illustrate a relative orientation of the fourth element with respect to the third element that matches a relative orientation of the second element with respect to the first element.

10. The computer system of claim 9, wherein the first element and the third element are rotationally asymmetric.

11. The computer system of claim 9, wherein the second element overlaps the first element, and wherein the fourth element overlaps the third element.

12. The computer system of claim 8, wherein the challenge key comprises a coordinate location, wherein the correct image that conforms to the one or more aspects of the challenge key each illustrate a relative orientation of the fourth element with respect to the third element that matches the coordinate location of the challenge key.

13. The computer system of claim 12, wherein the third element comprises a grid pattern, wherein the coordinate location indicates a location within the grid pattern of the third element, and wherein the correct image that conforms to the one or more aspects of the challenge key each illustrate the fourth element at the location within the grid pattern of the third element indicated by the coordinate location of the challenge key.

14. The computer system of claim 13, where a first grid pattern of a first image of the plurality of images comprises a different orientation of rows and columns than a second image of the plurality of images.

15. A non-transitory computer-readable storage medium including instructions that, when executed by a processing device, cause the processing device to:

sign information associated with a user computer system to generate signed information;

send, to the user computer system, the signed information to cause the user computer system to send a request for access to a computer resource;

generate, for a user computer system, a challenge data structure defining a challenge to select a correct image that conforms to one or more aspects of a challenge key from a plurality of images based on a relative orientation with respect to one another of elements within the plurality of images;

send, by the processing device, the challenge data structure to the user computer system to cause the challenge data structure to be presented to a user of the user computer system, wherein the challenge key comprises a first element and a second element and the correct image comprises a third element and a fourth element, wherein the first element corresponds to the third element and the second element corresponds to the fourth element, wherein the first element illustrates a particular shape and the third image illustrates the particular shape with a portion obscured, wherein the first element and the second element of the challenge key are illustrated in a two-dimensional perspective, and the third element and the fourth element of the correct image are a 2D rendering of a three-dimensional (3D) virtual object with properties that match the challenge data structure, wherein the challenge data structure further comprises challenge text that explicitly indicates a correspondence between the second element of the challenge key and the fourth element of the correct image and specifies that the second element and the fourth element are different shapes, and wherein the first element and the second element are presented as line-drawing icons and the third element and the fourth element are presented as a photorealistic rendering;

obtain a user response representing at least one user-selected image from the plurality of images; and provide access to a computer resource for the user computer system based on whether the at least one user-selected image is consistent with the correct image.

16. The non-transitory computer-readable storage medium of claim 15, wherein the correct image that conforms to the one or more aspects of the challenge key each illustrate a relative orientation of the fourth element with respect to the third element that matches a relative orientation of the second element with respect to the first element.

17. The non-transitory computer-readable storage medium of claim 16, wherein the first element and the third element are rotationally asymmetric.

18. The non-transitory computer-readable storage medium of claim 16, wherein the second element overlaps the first element, and wherein the fourth element overlaps the third element.

19. The non-transitory computer-readable storage medium of claim 15, wherein the challenge key comprises a coordinate location, wherein the correct image that conforms to the one or more aspects of the challenge key each illustrate a relative orientation of the fourth element with respect to the third element that matches the coordinate location of the challenge key.

20. The non-transitory computer-readable storage medium of claim 19, wherein the third element comprises a grid pattern, wherein the coordinate location indicates a location within the grid pattern of the third element, and wherein the correct image that conforms to the one or more aspects of the challenge key each illustrate the fourth element at the location within the grid pattern of the third element indicated by the coordinate location of the challenge key.

* * * * *